(12) United States Patent (10) Patent No.: US 9,290,908 B2
Hiroki et al. (45) Date of Patent: Mar. 22, 2016

(54) HYBRID CONSTRUCTION MACHINE

(75) Inventors: Takenori Hiroki, Ibaraki-ken (JP); Manabu Edamura, Kasumigaura (JP); Toshihiko Ishida, Hitachi (JP); Manabu Sugiura, Tsuchiura (JP); Hidetoshi Satake, Ishioka (JP); Kouji Ishikawa, Kasumigaura (JP); Takatoshi Ooki, Kasumigaura (JP); Shinji Nishikawa, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 508 days.

(21) Appl. No.: 13/640,378

(22) PCT Filed: May 16, 2011

(86) PCT No.: PCT/JP2011/061247
§ 371 (c)(1),
(2), (4) Date: Oct. 10, 2012

(87) PCT Pub. No.: WO2011/145585
PCT Pub. Date: Nov. 24, 2011

(65) Prior Publication Data
US 2013/0058750 A1 Mar. 7, 2013

(30) Foreign Application Priority Data

May 21, 2010 (JP) ................................. 2010-117025

(51) Int. Cl.
*E02F 9/20* (2006.01)
*E02F 9/12* (2006.01)
*E02F 9/22* (2006.01)

(52) U.S. Cl.
CPC ................ *E02F 9/123* (2013.01); *E02F 9/207* (2013.01); *E02F 9/2075* (2013.01); *E02F 9/2091* (2013.01); *E02F 9/2095* (2013.01); *E02F 9/226* (2013.01); *E02F 9/2296* (2013.01)

(58) Field of Classification Search
CPC ............ E02F 9/12; E02F 9/123; E02F 9/2058
See application file for complete search history.

(56) References Cited

U.S. PATENT DOCUMENTS 6,666,022 B1 12/2003 Yoshimatsu et al.
7,242,311 B2 * 7/2007 Hoff et al. ...................... 340/679
(Continued)

FOREIGN PATENT DOCUMENTS

EP 1793128 A1 6/2007
EP 2620555 A1 7/2013
(Continued)

OTHER PUBLICATIONS

International Search Report received in International Application No. PCT/JP2011/061247 dated Dec. 20, 2012.
(Continued)

*Primary Examiner* — Nathaniel Wiehe
*Assistant Examiner* — Dustin T Nguyen
(74) *Attorney, Agent, or Firm* — Mattingly & Malur, PC

(57) ABSTRACT

A hybrid construction machine is capable of performing satisfactory operations even when trouble occurs that disables the electric motor from outputting torque. The hybrid construction has both a hydraulic motor and an electric motor driving the swing structure and a controller for switching between a hydraulic/electric hybrid swing mode (using both the hydraulic motor and the electric motor) and a hydraulic-alone swing mode (using only the hydraulic motor). The switching is executed while achieving satisfactory operability and performance in each mode. Normally, an energy saving operation is performed in the hydraulic/electric hybrid swing mode. When the electric amount of an electricity storage device has gone out of a prescribed range or an abnormality has occurred in an electric system (e.g., failure of an inverter), the swing mode is switched to the hydraulic-alone swing mode so that driving with normal braking torque is possible by the hydraulic motor alone.

14 Claims, 19 Drawing Sheets

(56) References Cited

U.S. PATENT DOCUMENTS

| | | | | |
|---|---|---|---|---|
| 7,279,801 | B2 * | 10/2007 | Kagoshima | 290/40 C |
| 8,544,576 | B2 * | 10/2013 | Shono et al. | 180/65.265 |
| 2007/0108837 | A1 * | 5/2007 | Ohkubo et al. | 303/122.08 |
| 2008/0317574 | A1 * | 12/2008 | Moriya et al. | 414/687 |

FOREIGN PATENT DOCUMENTS

| | | | | |
|---|---|---|---|---|
| JP | 2001-016704 A | 1/2001 | | |
| JP | 2004-124381 A | 4/2004 | | |
| JP | 3647319 B2 | 5/2005 | | |
| JP | 2005290882 | * 10/2005 | | E02F 9/20 |
| JP | WO2007/105462 | * 9/2007 | | E02F 9/00 |
| JP | 4024120 B2 | 12/2007 | | |
| JP | 2008-63888 A | 3/2008 | | |
| JP | 2008-291522 A | 12/2008 | | |
| WO | 2012/039083 A1 | 3/2012 | | |

OTHER PUBLICATIONS

Extended European Search Report received in corresponding European Application No. 11783519.9 dated Jun. 23, 2015.

* cited by examiner

//HYBRID CONSTRUCTION MACHINE

TECHNICAL FIELD

The present invention relates to a hybrid construction machine. The invention more particularly relates to a hybrid construction machine having a swing structure such as a hydraulic shovel.

BACKGROUND ART

A construction machine such as a hydraulic shovel uses fuel (gasoline, light oil, etc.) as the power source of its engine and drives hydraulic actuators (hydraulic motor, hydraulic cylinder, etc.) using hydraulic pressure generated by a hydraulic pump which is driven by the engine. Being small-sized, lightweight and capable of outputting high power, the hydraulic actuators are widely used as actuators for construction machines.

Meanwhile, there has recently been proposed a construction machine using an electric motor and an electricity storage device (battery, electric double layer capacitor, etc.) and thereby realizing higher energy efficiency and more energy saving compared to conventional construction machines using only hydraulic actuators (Patent Document 1).

Electric motors (electric actuators) have some excellent features in terms of energy, such as higher energy efficiency compared to hydraulic actuators and the ability to regenerate electric energy from kinetic energy at the time of braking. The kinetic energy is released and lost as heat in the case of hydraulic actuators.

For example, Patent Document 1 discloses an embodiment of a hydraulic shovel having an electric motor as the actuator for driving the swing structure. The actuator for driving and swinging the upper swing structure of the hydraulic shovel with respect to the lower travel structure (a hydraulic motor was used in conventional hydraulic shovels) is used frequently and repeats start/stop and acceleration/deceleration frequently in work.

When a hydraulic actuator is used for driving the swing structure, the kinetic energy of the swing structure in deceleration (braking) is lost as heat in the hydraulic circuit. In contrast, energy saving can be realized by use of an electric motor since regeneration of the kinetic energy into electric energy is expected.

There have also been proposed and disclosed construction machines that are equipped with both a hydraulic motor and an electric motor so as to drive the swing structure by total torque of the hydraulic motor and the electric motor (Patent Documents 2 and 3).

Patent Document 2 discloses an energy regeneration device of a hydraulic construction machine in which an electric motor is connected directly to the hydraulic motor for driving the swing structure. A controller determines the output torque of the electric motor based on the operation amount of the control lever and sends an output torque command to the electric motor. In deceleration (braking), the electric motor regenerates the kinetic energy of the swing structure into electric energy and accumulates the regenerated energy in a battery.

Patent Document 3 discloses a hybrid construction machine which performs output torque splitting between the hydraulic motor and the electric motor by calculating a torque command value for the electric motor using the differential pressure between the inlet side and the outlet side of the hydraulic motor for the swing driving.

Both of the conventional techniques of Patent Documents 2 and 3 use an electric motor and a hydraulic motor together as the actuators for the swing driving and thereby realize operation with no feeling of strangeness even for operators familiar with conventional construction machines driven by a hydraulic actuator, as well as achieving energy saving with a configuration that is simple and easy to put into practical use.

PRIOR ART DOCUMENT

Patent Document

Patent Document 1: Japanese Patent No. 3647319
Patent Document 2: Japanese Patent No. 4024120
Patent Document 3: JP,A 2008-63888

SUMMARY OF THE INVENTION

Problem to be Solved by the Invention

In the hybrid hydraulic shovel described in the Patent Document 1, the kinetic energy of the swing structure in deceleration (braking) is regenerated by the electric motor into electric energy, which is effective from the viewpoint of energy saving.

However, using an electric motor, having different characteristics from hydraulic motors, for driving the swing structure of a construction machine can cause the following problems:

(1) Hunting (especially in a low speed range, stopped state) due to inappropriate speed feedback control of the electric motor, etc.

(2) Feeling of strangeness about the operation (manipulation) of the construction machine caused by the difference in characteristics from hydraulic motors.

(3) Overheating of the motor or inverter during an operation/work (e.g., pressing operation) that requires continuous torque output with no rotation of the motor.

(4) Increase in the size of the motor or considerable increase in costs due to the use of an electric motor guaranteeing high output equivalent to that of hydraulic motors.

The hybrid hydraulic shovels described in the Patent Documents 2 and 3 solve the above problems by employing both a hydraulic motor and an electric motor and driving the swing structure by the total torque of the motors, thereby realizing operation with no feeling of strangeness even for operators familiar with conventional construction machines driven by a hydraulic actuator, as well as achieving energy saving with a configuration that is simple and easy to put into practical use.

However, in every one of the conventional techniques described in the above Patent Documents 1 to 3, the electric motor is constantly accounted for a certain part of the total torque necessary for the swing driving. Therefore, when the electric motor is incapable of generating torque for some reason (failure/abnormality in an electric system (inverter, motor, etc.), a low energy state or an overcharged state of the electricity storage device, etc.), the total torque becomes insufficient for driving the swing structure and it becomes impossible to start/stop the swing structure as in the normal state.

For example, if an abnormality occurs suddenly when the swing structure is swinging at a high speed with high kinetic energy, the electric motor falls into a free running state and cannot be stopped by the conventional technique of Patent Document 1. Even with the conventional techniques of Patent Documents 2 and 3, the stopping distance and the stopping time increase compared to the normal state, which can lead to a serious problem in terms of safety.

Further, the amount of energy stored in the electricity storage device can be too small just after the startup of the machine due to self-discharge of the electricity storage device while the machine is stopped/stored, etc. In this case, the swing operation cannot be started immediately because of the electric swing motor being incapable of outputting power. Since it is first necessary to charge the electricity storage device until a prescribed amount of electricity is accumulated, the operator has to wait on standby for the completion of the charging even when work should be started immediately.

It is therefore the primary object of the present invention to provide a hybrid construction machine (construction machine using an electric motor for the driving of the swing structure) capable of performing satisfactory operations even when trouble disabling the electric motor from outputting torque has occurred for some reason.

Means for Solving the Problem

A hybrid construction machine in accordance with the present invention includes both a hydraulic motor and an electric motor for the driving of the swing structure and a swing mode regarding the driving of the swing structure is switched by a control device between a hydraulic/electric hybrid swing mode for driving the swing structure by driving both the hydraulic motor and the electric motor and a hydraulic-alone swing mode for driving the swing structure by driving only the hydraulic motor. The switching between the hydraulic/electric hybrid swing mode and the hydraulic-alone swing mode is executed while achieving satisfactory operability and performance in each mode. Normally, an energy saving operation is performed in the hydraulic/electric hybrid swing mode. When the amount of electricity of the electricity storage device has gone out of a prescribed range or an abnormality has occurred in an electric system (e.g., failure of an inverter), the swing mode is switched to the hydraulic-alone swing mode so that driving with normal braking torque is possible by the hydraulic motor alone even when the electric motor falls into a free running state.

Effect of the Invention

According to the present invention, the construction machine is equipped with both a hydraulic motor and an electric motor for the driving of the swing structure and is configured to be switchable between the mode for executing the swing driving with the torque of both the hydraulic motor and the electric motor (hydraulic/electric hybrid swing mode) and the mode for executing the swing driving with the hydraulic motor alone (hydraulic-alone swing mode). Thus, in the hydraulic/electric hybrid swing mode, operational actions specific to the hydraulic actuator (e.g., pressing excavation) and operational feeling specific to the hydraulic actuator can be realized while also achieving energy saving by regenerating the kinetic energy of the swing structure into electric energy through the electric motor at the time of braking (deceleration). Even in case of insufficiency of the energy remaining in the electricity storage device for storing the regenerated electric energy, overcharging of the electricity storage device, or a failure, abnormality or warning occurring in the electric system, it is possible to drive the swing structure with normal swing torque using the hydraulic motor alone and continue the operation (work) by the switching of the swing mode to the hydraulic-alone swing mode. Furthermore, even when the energy remaining in the electricity storage device is insufficient at the startup of the construction machine, the operation (work) can be started immediately.

As above, the present invention enables construction machines to perform satisfactory operations even when trouble disabling the electric motor from outputting torque has occurred for some reason.

MODE FOR CARRYING OUT THE INVENTION

In the following, preferred embodiments in accordance with the present invention will be described by taking hydraulic shovels as examples of construction machines. The present invention is applicable to a wide variety of construction machines (e.g., operating machines) having a swing structure and thus the application of the present invention is not restricted to hydraulic shovels. For example, the present invention is applicable also to other types of construction machines such as crane trucks having a swing structure.

Figure 1:
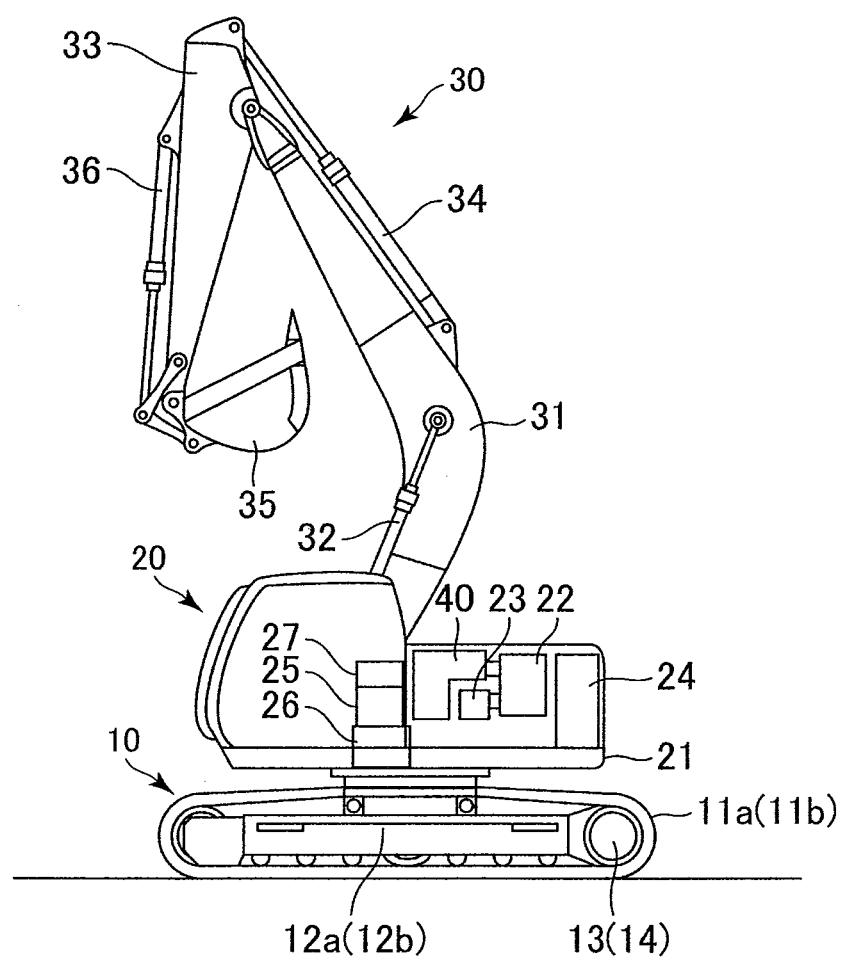
FIG. 1 is a side view of a hybrid hydraulic shovel in accordance with a first embodiment of the present invention.

FIG. 1 is a side view of a hybrid hydraulic shovel in accordance with a first embodiment of the present invention.

In FIG. 1, the hybrid hydraulic shovel includes a lower travel structure 10, an upper swing structure 20 and a shovel mechanism 30.

The lower travel structure 10 includes a pair of crawlers 11a and 11b, a pair of crawler frames 12a and 12b (only one side is shown in FIG. 1), a pair of traveling hydraulic motors 13 and 14 for independently driving and controlling the crawlers 11a and 11b, respectively, reduction mechanisms for the traveling hydraulic motors 13 and 14, etc.

The upper swing structure 20 includes a swing frame 21, an engine 22 (as a prime mover) mounted on the swing frame 21, an power assist/generation motor 23 (charging device) driven by the engine 22, a electric swing motor 25, a hydraulic swing motor 27, an electric double layer capacitor 24 connected to the power assist/generation motor 23 and the electric swing motor 25, a reduction mechanism 26 for decelerating the rotations of the electric swing motor 25 and the hydraulic swing motor 27, etc. Driving force of the electric swing motor 25 and the hydraulic swing motor 27 is transmitted to the lower travel structure 10 via the reduction mechanism 26. By the driving force, the upper swing structure 20 (swing frame 21) is driven and swung relative to the lower travel structure 10.

The upper swing structure 20 is equipped with the shovel mechanism (front implement) 30. The shovel mechanism 30 includes a boom 31, a boom cylinder 32 for driving the boom 31, an arm 33 supported by a distal end part of the boom 31 to be rotatable around an axis, an arm cylinder 34 for driving the arm 33, a bucket 35 supported by the distal end of the arm 33 to be rotatable around an axis, a bucket cylinder 36 for driving the bucket 35, etc.

Further, a hydraulic system 40 for driving hydraulic actuators (such as the aforementioned traveling hydraulic motors 13 and 14, hydraulic swing motor 27, boom cylinder 32, arm cylinder 34 and bucket cylinder 36) is mounted on the swing frame 21 of the upper swing structure 20. The hydraulic system 40 includes a hydraulic pump 41 (see FIG. 2) as a hydraulic fluid source for generating the hydraulic pressure and a control valve 42 (see FIG. 2) for driving and controlling the actuators. The hydraulic pump 41 is driven by the engine 22.

Figure 2:
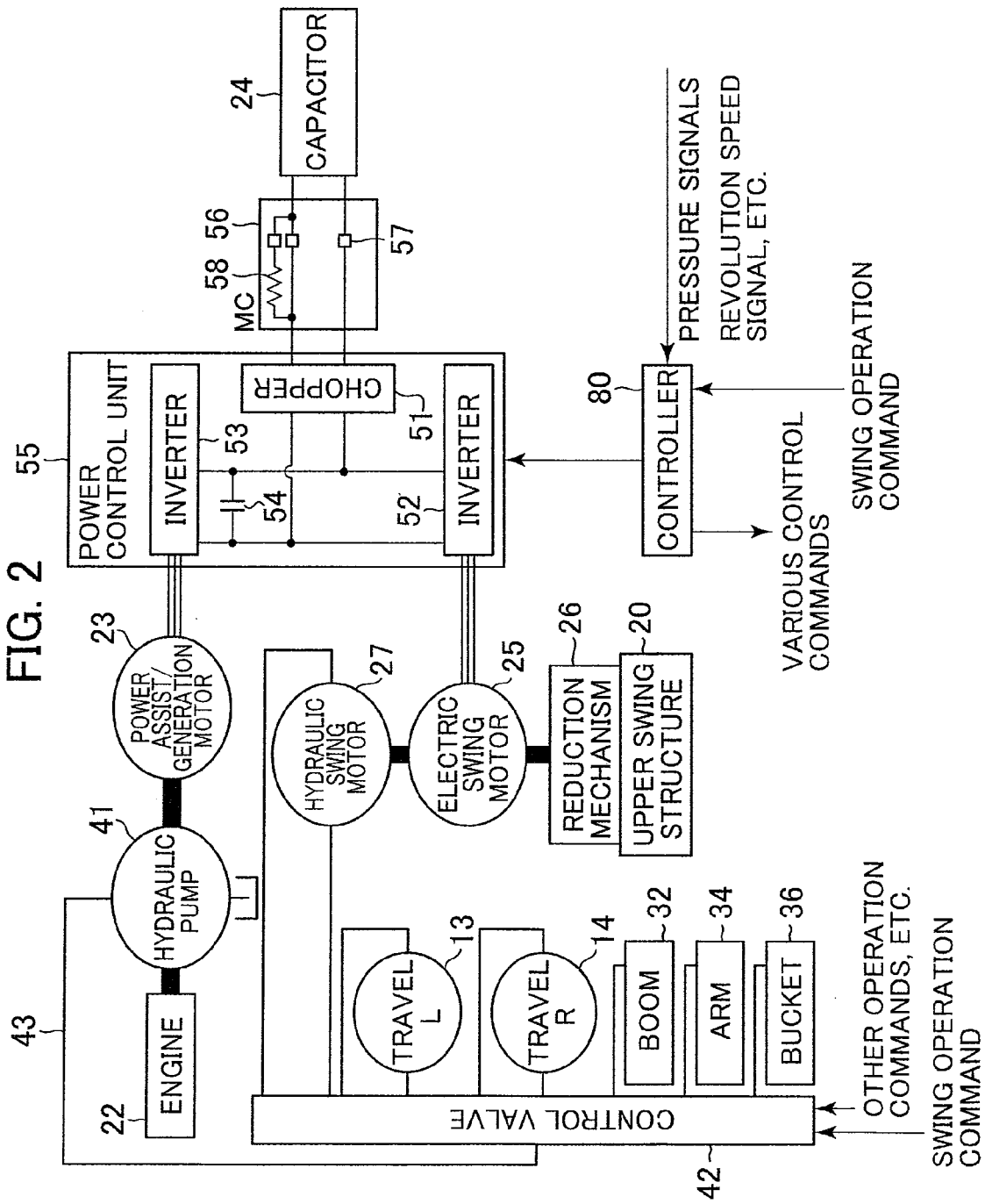
FIG. 2 is a system configuration diagram showing principal electric/hydraulic devices of the hybrid hydraulic shovel in accordance with the first embodiment of the present invention.

FIG. 2 shows the system configuration of principal electric/hydraulic devices of the hydraulic shovel. As shown in FIG. 2, the driving force of the engine 22 is transmitted to the hydraulic pump 41. The control valve 42 controls the flow rate and the direction of the hydraulic fluid supplied to the hydraulic swing motor 27 according to a swing operation command (hydraulic pilot signal) from a control lever device 72 (see FIG. 3) which is operated for the swing. The control valve 42 also controls the flow rates and the directions of the hydraulic fluid supplied to the boom cylinder 32, the arm cylinder 34, the bucket cylinder 36 and the traveling hydraulic motors 13 and 14 according to operation commands (hydraulic pilot signals) from a control lever device 73 (see FIG. 3) which is operated for movements other than the swing.

An electric system is made up of the power assist/generation motor 23, the capacitor 24, the electric swing motor 25, a power control unit 55, a main contactor 56, etc. The power control unit 55 includes a chopper 51, inverters 52 and 53, a smoothing capacitor 54, etc. The main contactor 56 includes a main relay 57, an inrush current prevention circuit 58, etc.

The voltage of DC power supplied from the capacitor 24 is boosted by the chopper 51 to a prescribed bus line voltage and is inputted to the inverter 52 (for driving the electric swing motor 25) and the inverter 53 (for driving the power assist/generation motor 23). The smoothing capacitor 54 is used for stabilizing the bus line voltage. The electric swing motor 25 and the hydraulic swing motor 27, whose rotating shafts are connected to each other, cooperatively drive the upper swing structure 20 via the reduction mechanism 26. The capacitor 24 is charged or discharged depending on the driving status (regenerating or power running) of the power assist/generation motor 23 and the electric swing motor 25.

A controller 80 generates control commands for the control valve 42 and the power control unit 55 using the swing operation command signal, pressure signals, a revolution speed signal, etc. (explained later) and executes a variety of control, such as switching between a hydraulic-alone swing mode and a hydraulic/electric hybrid swing mode, swing control in each mode, abnormality monitoring of the electric system and energy management.

Figure 3:
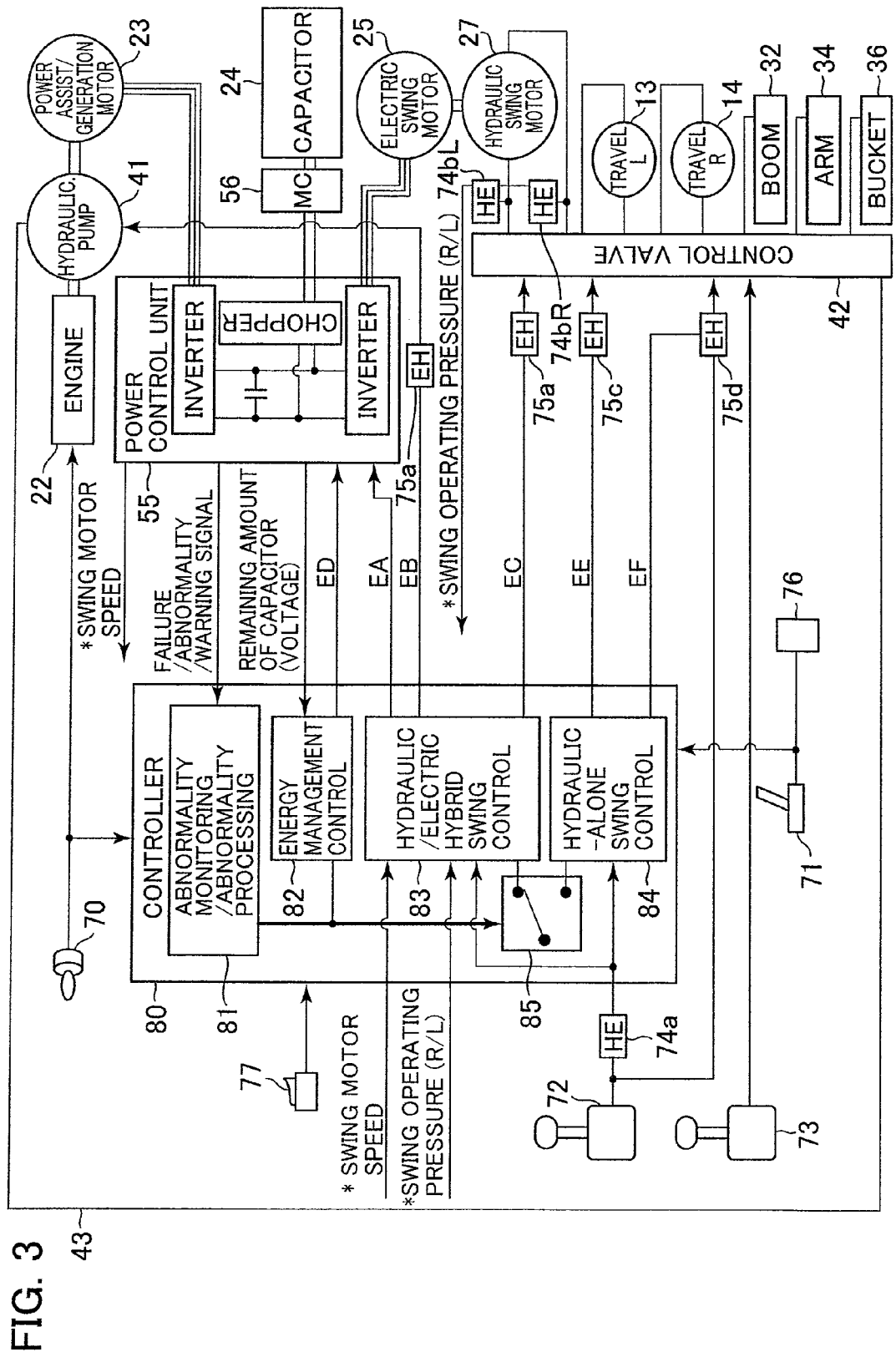
FIG. 3 is a block diagram showing the system configuration and control blocks of the hybrid hydraulic shovel in accordance with the first embodiment of the present invention.

FIG. 3 is a block diagram showing the system configuration and control blocks of the hydraulic shovel. While the system configuration of the electric/hydraulic devices shown in FIG. 3 is basically identical with that in FIG. 2, devices, control means, control signals, etc. necessary for carrying out the swing control in accordance with the present invention are shown in detail in FIG. 3.

The hydraulic shovel is equipped with an ignition key 70 for starting up the engine 22 and a gate lock lever device 71 for turning a pilot pressure shutoff valve 76 on and thereby disabling the operation of the hydraulic system when the operator stops the operation (work). The hydraulic shovel is further equipped with the aforementioned controller 80 and devices (hydraulic-electric conversion units 74a, 74bR and 74bL, electric-hydraulic conversion units 75a, 75b, 75c and 75d and a hydraulic-alone swing mode fixation switch 77) related to the input/output of the controller 80. These components constitute a swing control system. The hydraulic-electric conversion units 74a, 74bR and 74bL are implemented by pressure sensors, for example. The electric-hydraulic conversion units 75a, 75b, 75c and 75d are implemented by solenoid proportional pressure reducing valve, for example.

The controller 80 includes an abnormality monitoring/processing control block 81, an energy management control block 82, a hydraulic/electric hybrid swing control block 83, a hydraulic-alone swing control block 84, a switching control block 85, etc.

In a state in which the whole system has no abnormality and the driving of the electric swing motor 25 is possible, the controller 80 selects the hydraulic/electric hybrid swing mode. In this case, the switching control block 85 has selected the hydraulic/electric hybrid swing control block 83, and thus the operation of the swing actuator is controlled by the hydraulic/electric hybrid swing control block 83. The hydraulic pilot signal generated according to the operator's input to the swing control lever device 72 is converted by the hydraulic-electric conversion unit 74a into an electric signal and inputted to the hydraulic/electric hybrid swing control block 83. Operating pressures of the hydraulic swing motor 27 are converted by the hydraulic-electric conversion units 74bR and 74bL into electric signals and inputted to the hydraulic/electric hybrid swing control block 83. A swing motor speed signal which is outputted by an inverter (for driving the electric motor) inside the power control unit 55 is also inputted to the hydraulic/electric hybrid swing control block 83. The hydraulic/electric hybrid swing control block 83 calculates command torque for the electric swing motor 25 by performing prescribed calculations based on the hydraulic pilot signal from the swing control lever device 72, the operating pressure signals of the hydraulic swing motor 27 and the swing motor speed signal, and outputs a torque command EA to the power control unit 55. At the same time, the hydraulic/electric hybrid swing control block 83 outputs reduced torque commands EB and EC, for reducing the output torque of the hydraulic pump 41 and the output torque of the hydraulic swing motor 27 by the torque outputted by the electric motor 25, to the electric-hydraulic conversion units 75a and 75b.

Meanwhile, the hydraulic pilot signal generated according to the operator's input to the swing control lever device 72 is inputted also to the control valve 42, by which a spool 61 (see FIG. 4) for the swing motor is switched from its neutral position, the hydraulic fluid discharged from the hydraulic pump 41 is supplied to the hydraulic swing motor 27, and consequently, the hydraulic swing motor 27 is also driven at the same time.

The amount of electricity stored in the capacitor 24 (electric amount) increases/decreases depending on the difference between the energy consumed by the electric motor 25 in acceleration and the energy regenerated by the electric motor 25 in deceleration. This is controlled by the energy management control block 82. The energy management control block 82 performs the control so as to keep the electric amount of the capacitor 24 within a prescribed range by outputting a power assist/generation command ED to the power assist/generation motor 23.

When a failure, an abnormality or a warning state has occurred in the electric system (the electric motor 25, the capacitor 24, the power control unit 55, etc.) or the electric amount of the capacitor 24 has gone out of the prescribed range, the abnormality monitoring/processing control block 81 and the energy management control block 82 switch the switching control block 85 to make it select the hydraulic-alone swing control block 84, by which the swing mode is switched from the hydraulic/electric hybrid swing mode to the hydraulic-alone swing mode. Basically, the swing hydraulic system has been properly matched with the electric swing motor 25 so as to operate in coordination with the electric motor 25. Thus, the hydraulic-alone swing control block 84 executes the control so that the swing operability is not impaired even without the torque of the electric motor 25, by making a correction of increasing the drive torque of the hydraulic motor 27 and a correction of increasing the braking torque of the hydraulic motor 27 by outputting a swing drive property correction command EE and a swing pilot pressure correction command EF to the electric-hydraulic conversion units 75c and 75d, respectively.

The hydraulic-alone swing mode fixation switch 77 is used when the swing mode has to be fixed in the hydraulic-alone swing mode for some reason (when the electric system is in failure, when a particular attachment has to be attached, etc.). When the fixation switch 77 is turned to its ON position, the switching control block 85 is fixed at the position for selecting the hydraulic-alone swing control block 84.

Figure 4:
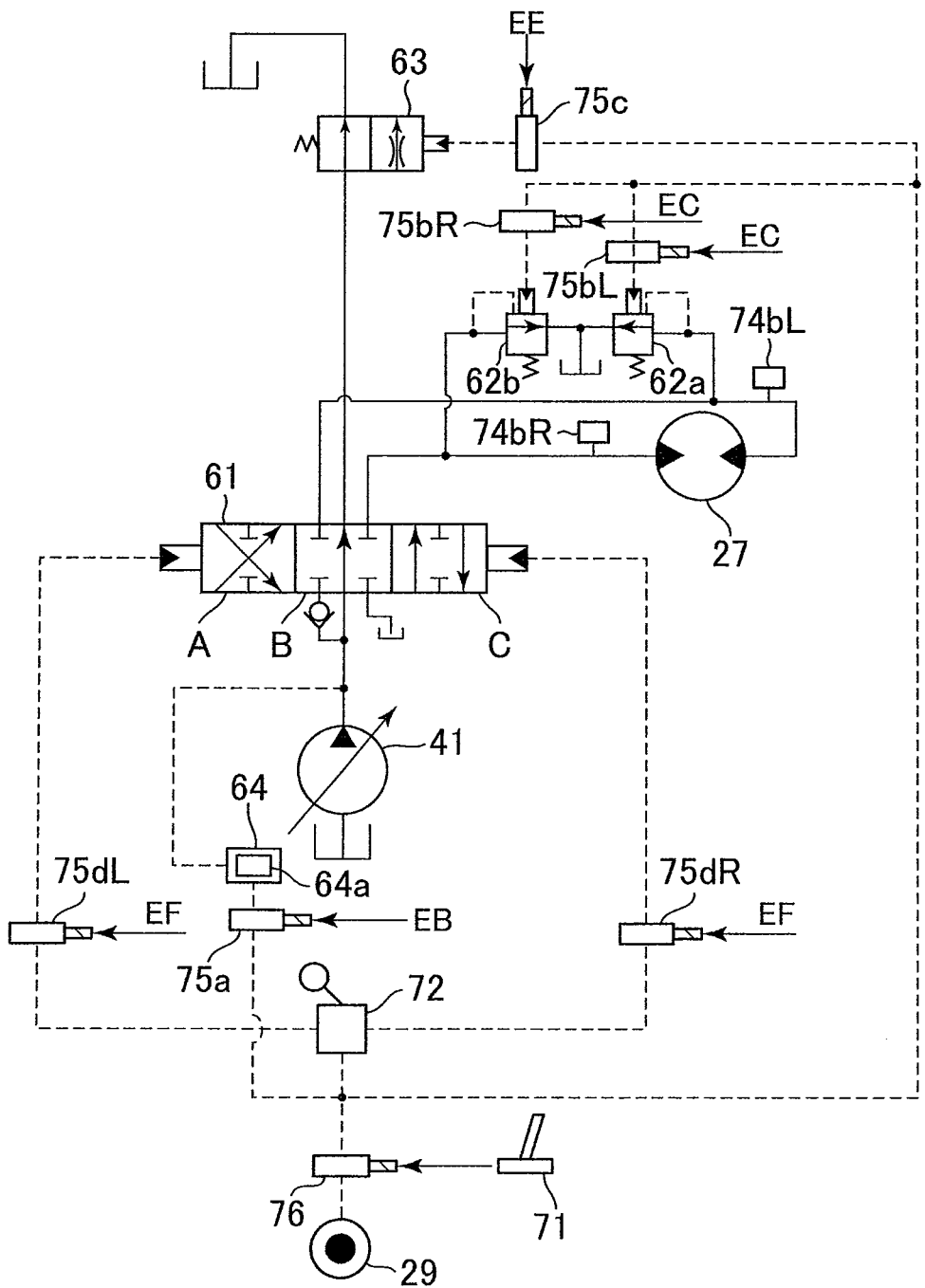
FIG. 4 is a schematic diagram showing the configuration of a swing hydraulic system in the first embodiment of the present invention.

FIG. 4 shows the details of the swing hydraulic system, wherein elements identical with those in FIG. 3 are indicated with the same reference characters as in FIG. 3. The control valve 42 shown in FIG. 3 has a valve component called "spool" for each actuator. In response to a command (hydraulic pilot signal) from the control lever device 72 or 73, a corresponding spool shifts so as to change an opening area, by which the flow rate of the hydraulic fluid passing through each spool's channel changes. In the swing hydraulic system shown in FIG. 4, only a part of the circuit including the swing spool (spool for the swing) is excerpted.

The swing hydraulic system can be switched between a first mode in which the maximum output torque of the hydraulic swing motor 27 is set at first torque and a second mode in which the maximum output torque of the hydraulic swing motor 27 is set at second torque higher than the first torque. The details of the switching will be explained below.

Referring to FIG. 4, the swing hydraulic system includes the hydraulic pump 41, the hydraulic swing motor 27, the swing spool 61, variable over-load relief valves 62a and 62b for the swing, and a center bypass cut valve 63 as a swing auxiliary valve.

The hydraulic pump 41 is a variable displacement pump. The hydraulic pump 41 is equipped with a regulator 64 including a torque control unit 64a. By the operation of the regulator 64, the tilting angle of the hydraulic pump 41 is changed, the displacement (capacity) of the hydraulic pump 41 is changed, and consequently, the discharge flow rate and the output torque of the hydraulic pump 41 are changed. When the reduced torque command EB is outputted by the hydraulic/electric hybrid swing control block 83 (see FIG. 3) to the electric-hydraulic conversion unit 75a, the electric-hydraulic conversion unit 75a outputs corresponding control pressure to the torque control unit 64a of the regulator 64. Accordingly, the torque control unit 64a changes its setting so as to reduce the maximum output torque of the hydraulic pump 41 by the torque outputted by the electric motor 25.

Figure 5:
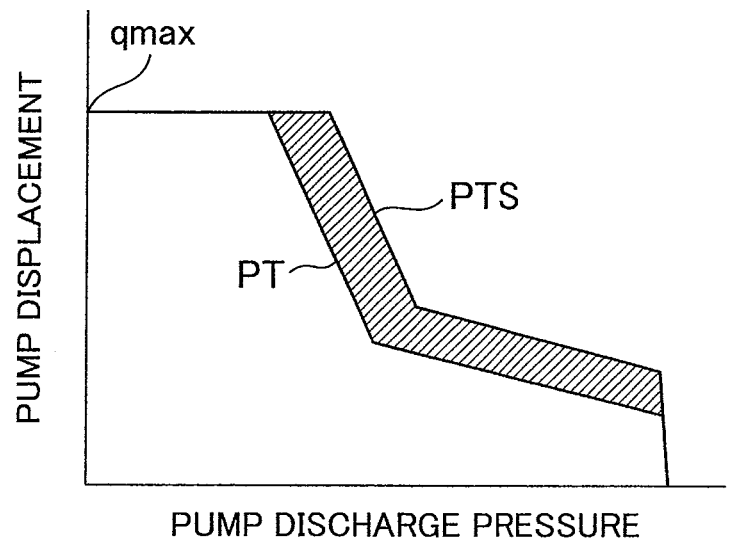
FIG. 5 is a graph showing the torque control characteristics of a hydraulic pump in the first embodiment of the present invention.

FIG. 5 is a graph showing the torque control characteristics of the hydraulic pump 41, wherein the horizontal axis represents the discharge pressure of the hydraulic pump 41 and the vertical axis represents the displacement of the hydraulic pump 41. The characteristics represented by the solid lines PT and PTS indicate the maximum torque that the hydraulic pump 41 can output.

When the hydraulic/electric hybrid swing mode has been selected and the reduced torque command EB is being outputted to the electric-hydraulic conversion unit 75a, the electric-hydraulic conversion unit 75a is generating the control pressure. In this case, the setting of the torque control unit 64a has the characteristics of the solid line PT (first mode) where the maximum output torque has decreased from that represented by the solid line PTS.

When the hydraulic-alone swing mode has been selected and the reduced torque command EB is not being outputted to the electric-hydraulic conversion unit 75a, the setting of the torque control unit 64a changes to the characteristics of the solid line PTS (second mode), by which the maximum output torque of the hydraulic pump 41 is increased by the area of the hatching.

Returning to FIG. 4, the swing spool 61 has three positions A, B and C. In response to the swing operation command (hydraulic pilot signal) from the control lever device 72, the swing spool 61 is switched continuously from the neutral position B to the position A or C.

The control lever device 72 includes a pressure-reducing valve which reduces the pressure supplied from a pilot hydraulic fluid source 29 according to the operation amount of the lever. The control lever device 72 supplies pressure corresponding to the lever operation amount (hydraulic pilot signal) to a right pressure chamber or a left pressure chamber of the swing spool 61.

When the swing spool 61 is at the neutral position B, the hydraulic fluid discharged from the hydraulic pump 41 passes through a bleed-off restrictor and the center bypass cut valve 63 and returns to the tank.

When the swing spool 61 receiving the pressure corresponding to the lever operation amount (hydraulic pilot signal) is switched to the position A, the hydraulic fluid from the hydraulic pump 41 is sent to the right side of the hydraulic swing motor 27 via a meter-in restrictor at the position A. The hydraulic fluid returning from the hydraulic swing motor 27 returns to the tank via a meter-out restrictor at the position A. Consequently, the hydraulic swing motor 27 rotates in a direction.

Conversely, when the swing spool 61 receiving the pressure corresponding to the lever operation amount (hydraulic pilot signal) is switched to the position C, the hydraulic fluid from the hydraulic pump 41 is sent to the left side of the hydraulic swing motor 27 via a meter-in restrictor at the position C. The hydraulic fluid returning from the hydraulic swing motor 27 returns to the tank via a meter-out restrictor at the position C. Consequently, the hydraulic swing motor 27 rotates in a direction opposite to the case of the position A.

When the swing spool 61 is situated at an intermediate position between the position B and the position A, the hydraulic fluid from the hydraulic pump 41 is distributed to the bleed-off restrictor and the meter-in restrictor. In this case, pressure corresponding to the opening area of the bleed-off restrictor and the opening area of the center bypass cut valve 63 develops on the inlet side of the meter-in restrictor. By the pressure, the hydraulic fluid is supplied to the hydraulic swing motor 27 and operating torque corresponding to the pressure (opening area of the bleed-off restrictor) is applied to the hydraulic swing motor 27. The hydraulic fluid discharged from the hydraulic swing motor 27 receives resistance corresponding to the opening area of the meter-out restrictor at that time (back pressure), by which braking torque corresponding to the opening area of the meter-out restrictor is generated. The same goes for cases where the swing spool 61 is situated at an intermediate position between the position B and the position C.

When the control lever of the control lever device 72 is returned to its neutral position and the swing spool 61 is returned to the neutral position B, the hydraulic swing motor 27 tends to keep on rotating due to the inertia of the upper swing structure 20 (inertial body). In this case, when the pressure of the hydraulic fluid discharged from the hydraulic swing motor 27 (back pressure) is about to exceed a preset pressure of the variable over-load relief valve 62a or 62b for the swing, the over-load relief valve 62a or 62b operates to drain part of the hydraulic fluid into the tank, by which the increase in the back pressure is restricted. Consequently, braking torque corresponding to the preset pressure of the over-load relief valve 62a or 62b is generated.

Figure 6A:
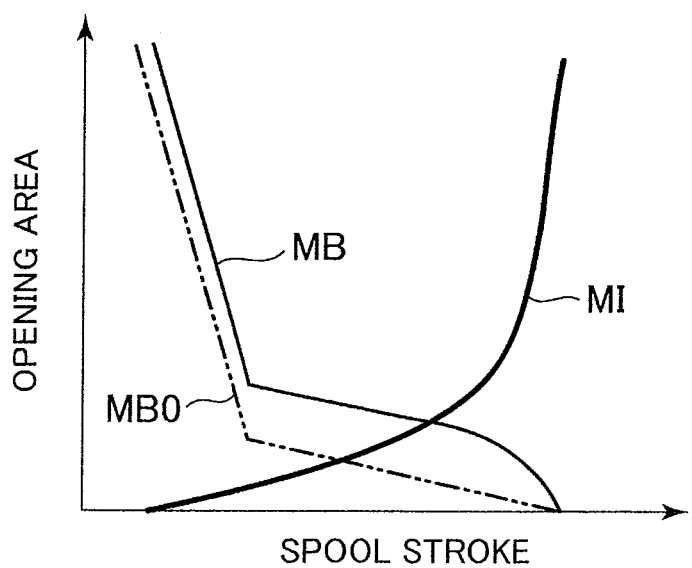
FIG. 6A is a graph showing a meter-in opening area characteristic and a bleed-off opening area characteristic of a swing spool in the first embodiment of the present invention.
Figure 6B:
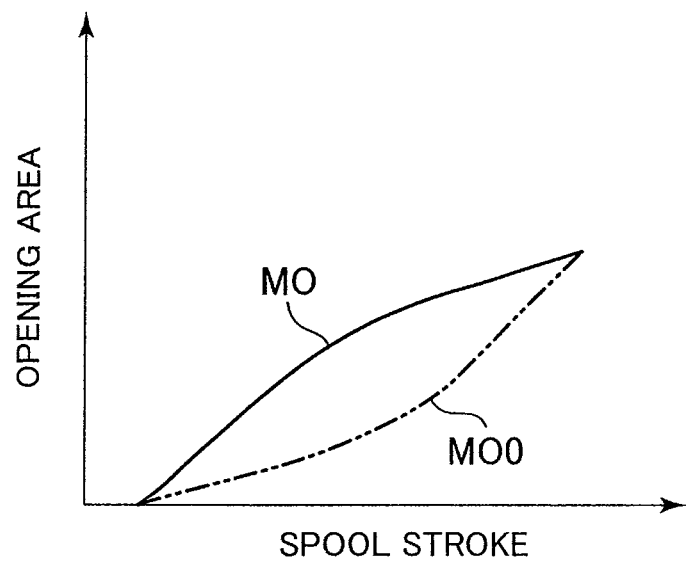
FIG. 6B is a graph showing a meter-out opening area characteristic of the swing spool in the first embodiment of the present invention.

FIG. 6A is a graph showing the meter-in opening area characteristic and the bleed-off opening area characteristic of the swing spool 61 in the first embodiment of the present invention. FIG. 6B is a graph showing the meter-out opening area characteristic of the swing spool 61 in the first embodiment of the present invention.

In FIG. 6A, the solid line MI indicates the meter-in opening area characteristic in this embodiment and the solid line MB indicates the bleed-off opening area characteristic in this embodiment. The two-dot chain line MBO indicates a bleed-off opening area characteristic with which satisfactory operability can be secured in a conventional hydraulic shovel using no electric motor. The bleed-off opening area characteristic MB in this embodiment is designed so that the opening areas at the starting point and the end point of the control zone coincide with those in the conventional characteristic but the opening areas in the intermediate zone (between the starting point and the end point) are larger than those in the conventional characteristic.

In FIG. 6B, the solid line MO indicates the meter-out opening area characteristic in this embodiment and the two-dot chain line MOO indicates a meter-out opening area characteristic with which satisfactory operability can be secured in the conventional hydraulic shovel using no electric motor. The meter-out opening area characteristic MO in this embodiment is designed so that the opening areas at the starting point and the end point of the control zone coincide with those in the conventional characteristic but the opening areas in the intermediate zone are larger than those in the conventional characteristic.

Figure 7:
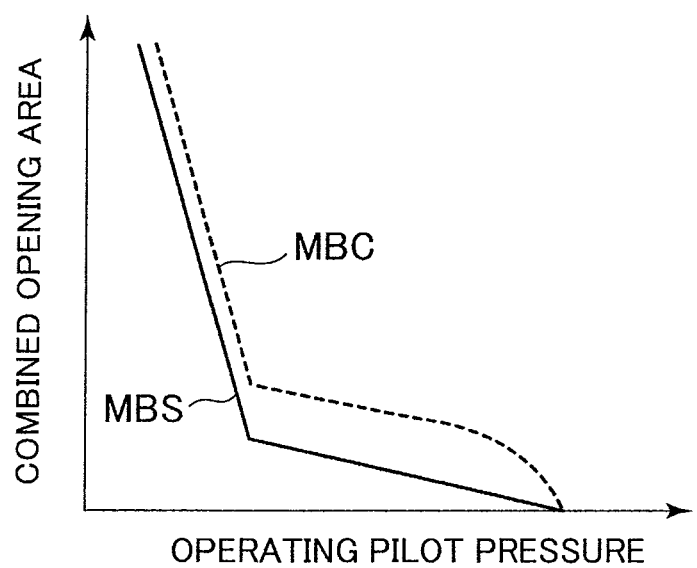
FIG. 7 is a graph showing a combined opening area characteristic of a meter-in restrictor of a swing spool and a center bypass cut valve with respect to a hydraulic pilot signal (operating pilot pressure) in the first embodiment of the present invention.

FIG. 7 is a graph showing a combined opening area characteristic of the meter-in restrictor of the swing spool 61 and the center bypass cut valve 63 with respect to the hydraulic pilot signal (operating pilot pressure).

When the hydraulic/electric hybrid swing mode has been selected, the swing drive property correction command EE is not outputted and thus the center bypass cut valve 63 is at the open position shown in FIG. 4. Therefore, the combined opening area characteristic of the meter-in restrictor of the swing spool 61 and the center bypass cut valve 63 is the characteristic indicated by the dotted line MBC (first mode) which is determined exclusively by the bleed-off opening area characteristic MB shown in FIG. 6A.

When the hydraulic-alone swing mode is selected, the swing drive property correction command EE is outputted to the electric-hydraulic conversion unit 75c as mentioned above. The electric-hydraulic conversion unit 75c outputs corresponding control pressure to a pressure receiving part of the center bypass cut valve 63, by which the center bypass cut valve 63 is switched to an restrictor position (to the right of the open position in FIG. 4). By the switching of the center bypass cut valve 63, the combined opening area characteristic of the meter-in restrictor of the swing spool 61 and the center bypass cut valve 63 with respect to the hydraulic pilot signal is changed to the characteristic of the solid line MBS (second mode) where the combined opening area is smaller than that in the characteristic of the dotted line MBC. This combined opening area characteristic of the solid line MBS is equivalent to the bleed-off opening area characteristic MBO in FIG. 6A capable of securing satisfactory operability in the conventional hydraulic shovel.

Figure 8:
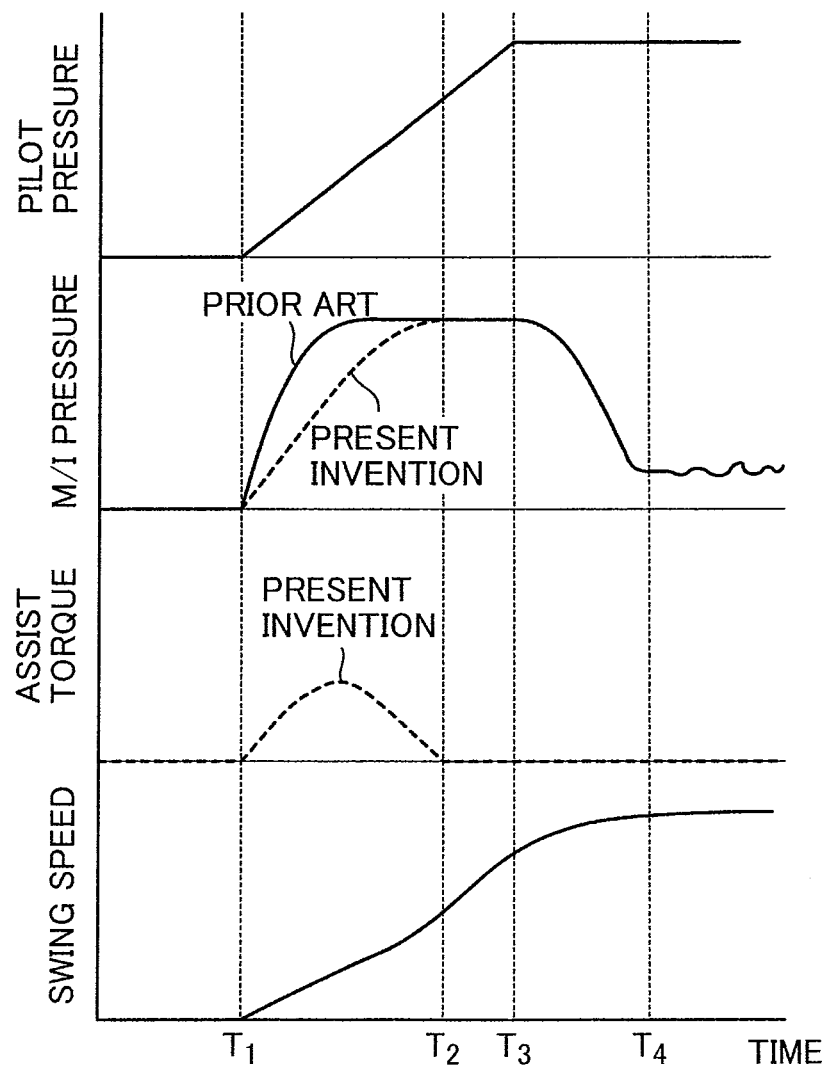
FIG. 8 is a graph showing time-series waveforms of the hydraulic pilot signal (pilot pressure), meter-in pressure (M/I pressure), assist torque of a electric swing motor and revolution speed (swing speed) of an upper swing structure in a swing driving operation in a hydraulic/electric hybrid swing mode in the first embodiment of the present invention.

FIG. 8 is a graph showing time-series waveforms of the hydraulic pilot signal (pilot pressure), the meter-in pressure (M/I pressure), the assist torque of the electric swing motor 25 and the revolution speed (swing speed) of the upper swing structure 20 in the swing driving operation in the hydraulic/electric hybrid swing mode. From a swing-stopped state in which the pilot pressure equals 0, the hydraulic pilot signal (pilot pressure) was increased with time (T=T1–T4) gradually (in a ramp-like shape) up to the maximum pilot pressure.

When the hydraulic/electric hybrid swing mode has been selected, the combined opening area characteristic of the meter-in restrictor of the swing spool 61 and the center bypass cut valve 63 is determined exclusively by the bleed-off opening area characteristic MB shown in FIG. 6A as indicated by the dotted line MBC in FIG. 7. Thus, the meter-in pressure (M/I pressure) in this embodiment becomes lower than that in the conventional hydraulic shovel due to the larger opening area of the bleed-off restrictor. Since the meter-in pressure corresponds to the operating torque (acceleration torque) of the hydraulic swing motor 27, acceleration torque compensating for the decrease in the meter-in pressure has to be provided by the electric motor 25. In FIG. 8, the positive assist torque means assist torque on the power running side. In this embodiment, the control is executed so that the total sum of the assist torque of the electric motor 25 and the acceleration torque deriving from the meter-in pressure caused by the swing spool 61 substantially equals the acceleration torque generated in the conventional hydraulic shovel. By this control, the swing speed of the upper swing structure 20 is allowed to give an acceleration feeling equivalent to that in the conventional hydraulic shovel.

In contrast, when the hydraulic-alone swing mode is selected, the combined opening area characteristic of the meter-in restrictor of the swing spool 61 and the center bypass cut valve 63 is changed to the characteristic of the solid line MBS shown in FIG. 7 where the combined opening area is smaller than that in the characteristic of the dotted line MBC. Thus, the meter-in pressure caused by the swing spool 61 increases to the meter-in pressure acquired in the conventional hydraulic shovel (solid line in FIG. 8) and the control is executed so that the acceleration torque deriving from the meter-in pressure caused by the swing spool 61 substantially equals the acceleration torque generated in the conventional hydraulic shovel. By this control, the swing speed of the upper swing structure 20 is allowed to give an acceleration feeling equivalent to that in the conventional hydraulic shovel.

The fact that the upper swing structure 20 can be swung by the hydraulic motor 27 alone means that the maximum output torque of the hydraulic swing motor 27 is higher than that of the electric swing motor 25. This means that even if the electric motor 25 happens to operate in an unexpected way in the hydraulic/electric hybrid swing mode, the trouble does not lead to any substantially dangerous movement as long as the hydraulic circuit is operating normally. Thus, the present invention is advantageous in terms of safety as well.

Figure 9:
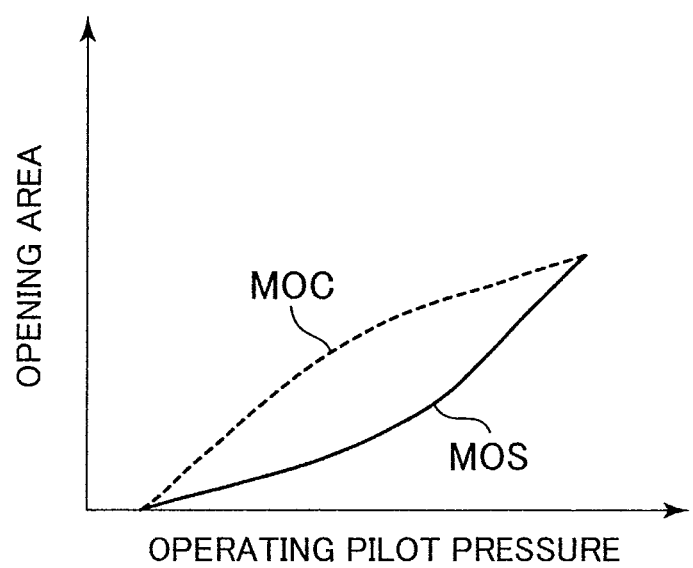
FIG. 9 is a graph showing a meter-out opening area characteristic of the swing spool with respect to the hydraulic pilot signal (operating pilot pressure) in the first embodiment of the present invention.

FIG. 9 is a graph showing a meter-out opening area characteristic of the swing spool 61 with respect to the hydraulic pilot signal (operating pilot pressure).

When the hydraulic/electric hybrid swing mode has been selected, the swing pilot pressure correction command EF is not outputted. Thus, the meter-out opening area characteristic of the swing spool 61 is indicated by the dotted line MOC (first mode) which exhibits variation similar to that of the meter-out opening area characteristic MO shown in FIG. 6B.

When the hydraulic-alone swing mode is selected, the swing pilot pressure correction command EF is outputted to the electric-hydraulic conversion unit 75$d$ shown in FIG. 3 (electric-hydraulic conversion units 75$d$R and 75$d$L shown in FIG. 4) as mentioned above. The electric-hydraulic conversion unit 75$d$ corrects (reduces) the hydraulic pilot signal (operating pilot pressure) generated by the control lever device 72. By the correction of the hydraulic pilot signal, the meter-out opening area characteristic of the swing spool 61 with respect to the hydraulic pilot signal is changed to the characteristic of the solid line MOS in FIG. 9 (second mode) where the opening area in the intermediate zone is smaller than that in the characteristic of the dotted line MOC. This opening area characteristic of the solid line MOS is equivalent to the meter-out opening area characteristic MOO in FIG. 6B capable of securing satisfactory operability in the conventional hydraulic shovel.

Figure 10:
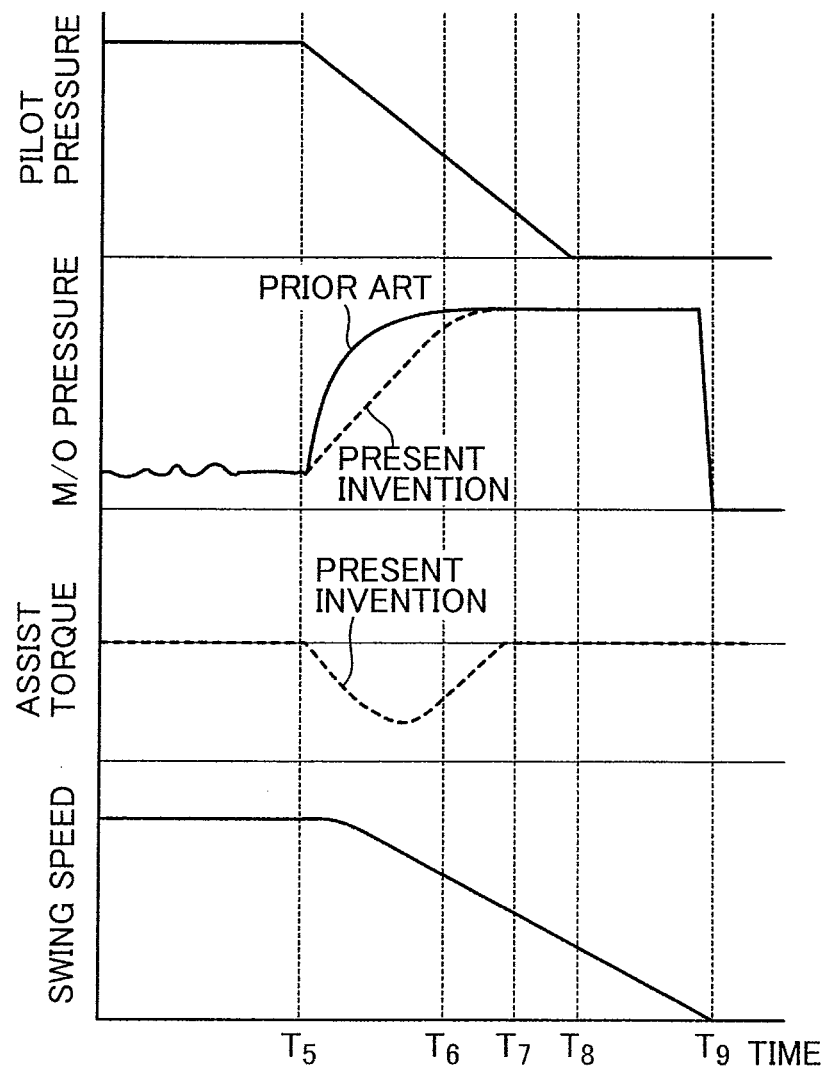
FIG. 10 is a graph showing time-series waveforms of the hydraulic pilot signal (pilot pressure), meter-out pressure (M/O pressure), the assist torque of the electric swing motor and the revolution speed (swing speed) of the upper swing structure in a swing braking/stopping operation in the hydraulic/electric hybrid swing mode in the first embodiment of the present invention.

FIG. 10 is a graph showing time-series waveforms of the hydraulic pilot signal (pilot pressure), the meter-out pressure (M/O pressure), the assist torque of the electric swing motor 25 and the revolution speed (swing speed) of the upper swing structure 20 in a swing braking/stopping operation in the hydraulic/electric hybrid swing mode. From the maximum swing speed with the maximum pilot pressure, the swing speed was reduced by decreasing the hydraulic pilot signal (pilot pressure) with time (T=T5–T9) gradually (in a ramp-like shape) down to 0.

When the hydraulic/electric hybrid swing mode has been selected, the meter-out opening area characteristic of the swing spool 61 with respect to the hydraulic pilot signal exhibits variation similar to that of the meter-out opening area characteristic MO in FIG. 6B as indicated by the dotted line MOC in FIG. 9. Thus, the meter-out pressure (M/O pressure) in this embodiment becomes lower than that in the conventional hydraulic shovel due to the larger opening area of the meter-out restrictor shown in FIG. 6B. Since the meter-out pressure corresponds to the brake torque (braking torque), brake torque compensating for the decrease in the meter-out pressure has to be provided by the electric motor 25. In FIG. 10, the negative assist torque means assist torque on the regeneration side. In this embodiment, the control is executed so that the total sum of the assist torque of the electric motor 25 and the brake torque deriving from the meter-out pressure caused by the swing spool 61 substantially equals the brake torque generated in the conventional hydraulic shovel. By this control, the swing speed of the upper swing structure 20 is allowed to give a deceleration feeling equivalent to that in the conventional hydraulic shovel.

In contrast, when the hydraulic-alone swing mode is selected, the meter-out opening area characteristic of the swing spool 61 with respect to the hydraulic pilot signal is changed to the characteristic of the solid line MOS shown in FIG. 9 where the opening area in the intermediate zone is smaller than that in the characteristic of the dotted line MOC. Thus, the meter-out pressure caused by the swing spool 61 increases to the meter-out pressure acquired in the conventional hydraulic shovel (solid line in FIG. 10) and the control is executed so that the brake torque deriving from the meter-out pressure caused by the swing spool 61 substantially equals the brake torque generated in the conventional hydraulic shovel. By this control, the swing speed of the upper swing structure 20 is allowed to give a deceleration feeling equivalent to that in the conventional hydraulic shovel.

Figure 11:
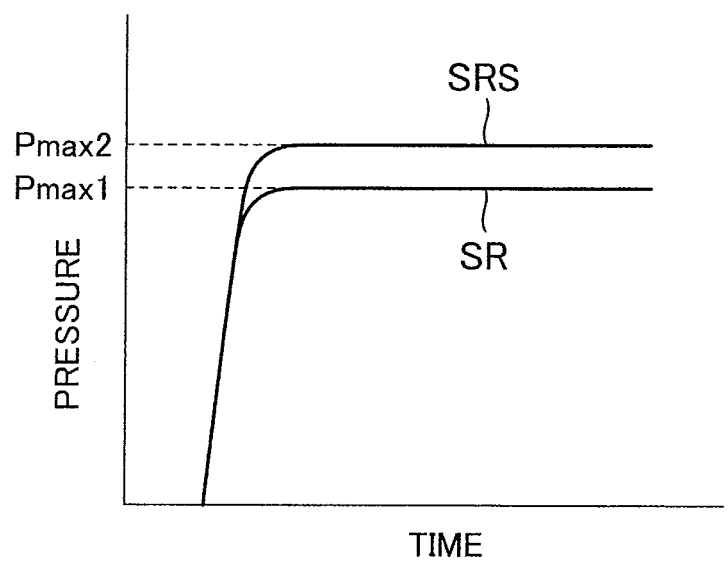
FIG. 11 is a graph showing relief pressure characteristics of variable over-load relief valves for the swing in the first embodiment of the present invention.

FIG. 11 is a graph showing relief pressure characteristics of the variable over-load relief valves 62a and 62b for the swing.

When the hydraulic/electric hybrid swing mode has been selected and the reduced torque command EC is being outputted to the electric-hydraulic conversion unit 75b shown in FIG. 3 (electric-hydraulic conversion units 75bR and 75bL shown in FIG. 4), the electric-hydraulic conversion unit 75b generates control pressure. The control pressure acts on one side of each variable over-load relief valve 62a, 62b to reduce the preset pressure of the valve, by which the relief characteristic of each variable over-load relief valve 62a, 62b is set at the characteristic of the solid line SR whose relief pressure equals Pmax1 (first mode).

When the hydraulic-alone swing mode has been selected and the reduced torque command EC is not being outputted to the electric-hydraulic conversion unit 75b (electric-hydraulic conversion units 75bR and 75bL shown in FIG. 4), the electric-hydraulic conversion unit 75b does not generate the control pressure. Thus, the relief characteristic of each variable over-load relief valve 62a, 62b is set at the characteristic of the solid line SRS whose relief pressure equals Pmax2 that is higher than Pmax1 (second mode). The braking torque increases corresponding to the increase in the relief pressure.

Thus, when the hydraulic/electric hybrid swing mode is selected, the relief pressure of each variable over-load relief valve 62a, 62b is set at Pmax1 that is lower than Pmax2. When the control lever of the control lever device 72 is returned to the neutral position, the pressure of the hydraulic fluid discharged from the hydraulic swing motor 27 (back pressure) rises to Pmax1 (the lower preset pressure of each variable over-load relief valve 62a, 62b) and the control is executed so that the total some of the assist torque of the electric motor 25 and the brake torque deriving from the back pressure caused by the variable over-load relief valve 62a or 62b substantially equals the brake torque generated in the conventional hydraulic shovel. By this control, the swing speed of the upper swing structure 20 is allowed to give a deceleration feeling equivalent to that in the conventional hydraulic shovel.

When the hydraulic-alone swing mode is selected, the relief pressure of each variable over-load relief valve 62a, 62b is set at Pmax2 higher than Pmax1. When the control lever of the control lever device 72 is returned to the neutral position, the pressure of the hydraulic fluid discharged from the hydraulic swing motor 27 (back pressure) rises to Pmax2 (the higher preset pressure of each variable over-load relief valve 62a, 62b) and the control is executed so that the brake torque deriving from the back pressure caused by the variable over-load relief valve 62a or 62b substantially equals the brake torque generated in the conventional hydraulic shovel. By this control, the swing speed of the upper swing structure 20 is allowed to give a deceleration feeling equivalent to that in the conventional hydraulic shovel.

Figure 12:
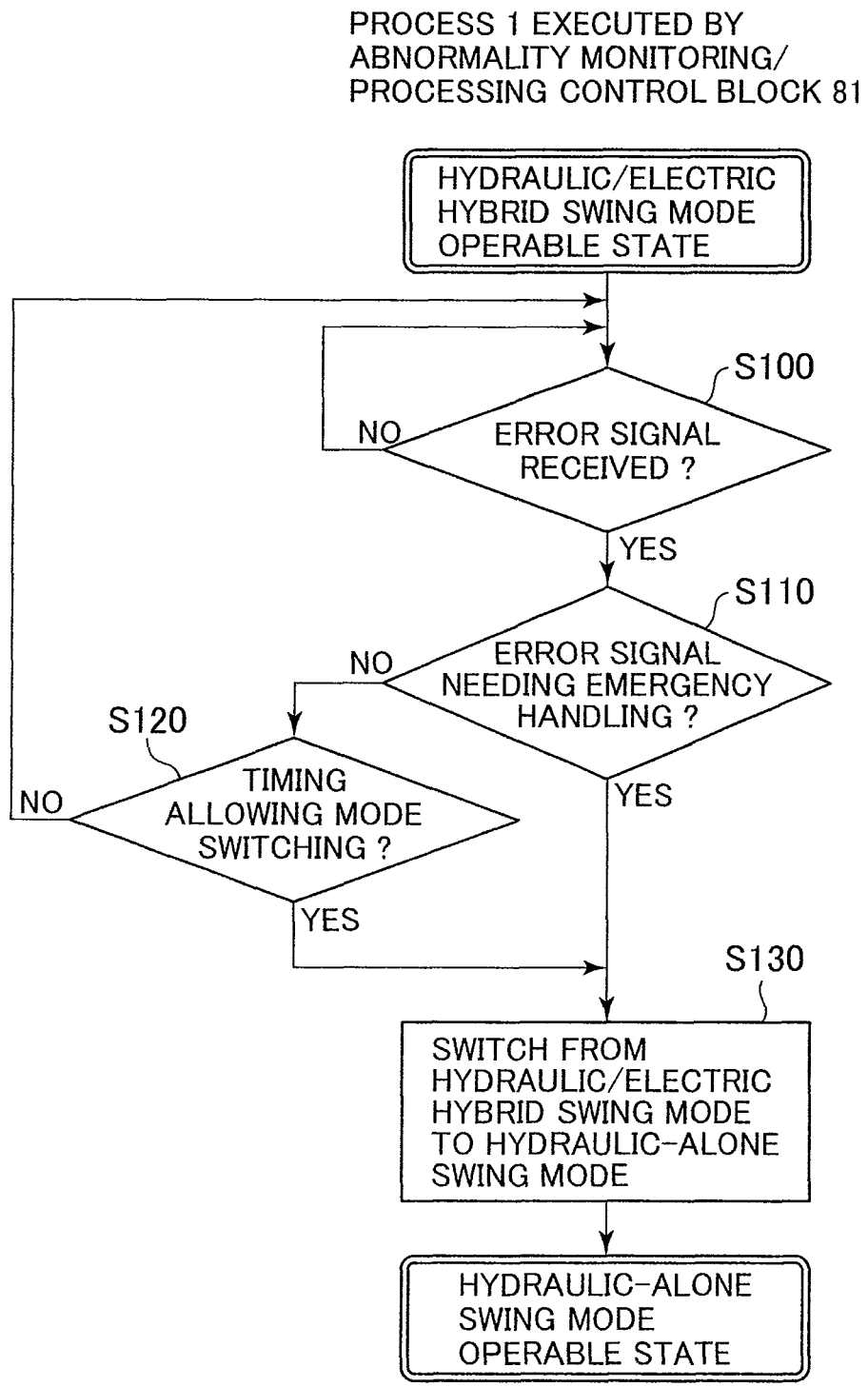
FIG. 12 is a flow chart showing an abnormality processing sequence (switching from the hydraulic/electric hybrid swing mode to a hydraulic-alone swing mode) of the hybrid hydraulic shovel in accordance with the first embodiment of the present invention.

FIG. 12 shows a sequence for switching the swing mode from the hydraulic/electric hybrid swing mode to the hydraulic-alone swing mode which is executed by the abnormality monitoring/processing control block 81 of the controller 80.

The abnormality monitoring/processing control block 81 judges whether a signal for reporting the occurrence of a failure, an abnormality or a warning state in the electric system (the electric motor 25, the capacitor 24, the power control unit 55, etc.) (hereinafter referred to as an "error signal") has been received from the power control unit 55 or not (step S100). If the error signal has been received, the abnormality monitoring/processing control block 81 further judges whether the error signal is an error signal that requires emergency handling (immediate action) or not (step S110). Since the mode switching can cause a slight shock due to a valve switching operation in the hydraulic system, etc., the abnormality monitoring/processing control block 81 judges whether the mode switching is possible with the present timing (at the present time) or not (step S120) unless the contents of the error signal indicate a serious problem (emergency) needing immediate mode switching. The abnormality monitoring/processing control block 81 carries out the mode switching (step S130) when there is no movement of the swing structure 20 and no input to the swing control lever device 72, or in an idling state in which there is no operation (including even a traveling by a device other than the swing structure 20, the movement of the front, and the input to the control lever device 73 for movements other than the swing) at all, for example. In case of an abnormality that can damage the system or lead to a significant failure or disaster (e.g., overcurrent abnormality in an inverter), the abnormality monitoring/processing control block 81 immediately stops the electric system and switches the swing mode to the hydraulic-alone swing mode (S110→S130) even during operation.

Figure 13:
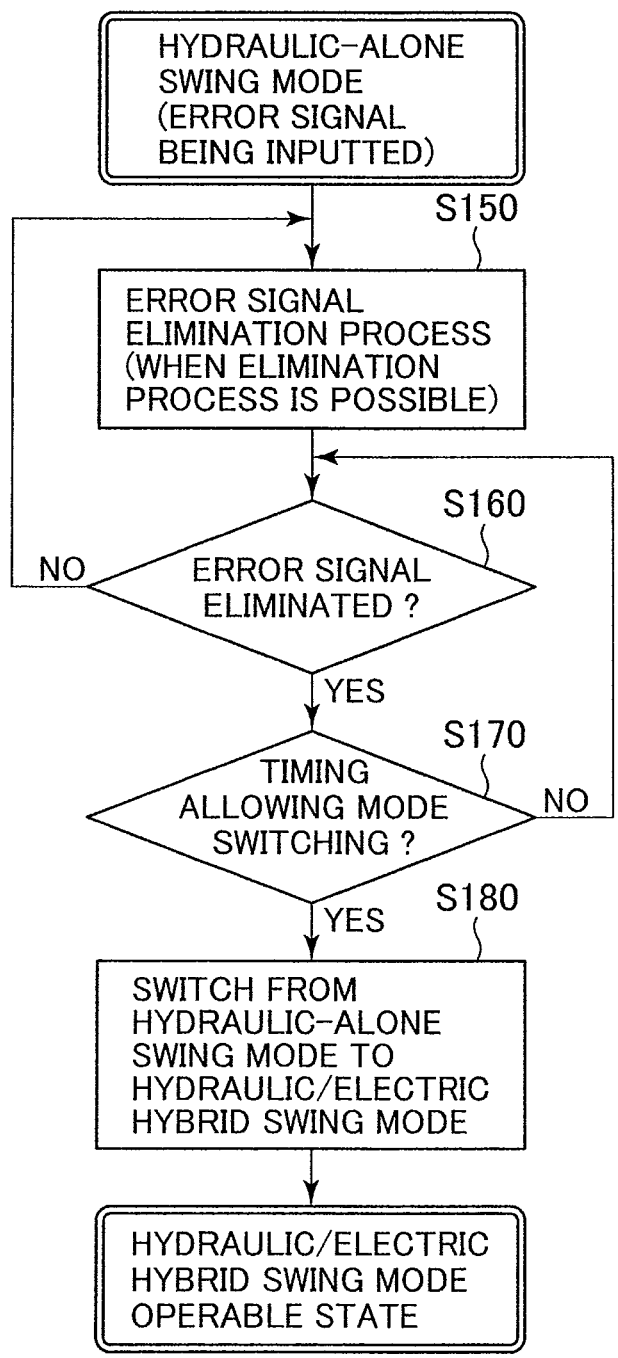
FIG. 13 is a flow chart showing an abnormality processing sequence (returning to the hydraulic/electric hybrid swing mode) of the hybrid hydraulic shovel in accordance with the first embodiment of the present invention.

FIG. 13 shows a sequence for returning the swing mode from the hydraulic-alone swing mode to the hydraulic/electric hybrid swing mode which is executed by the abnormality monitoring/processing control block 81 of the controller 80.

In the case where the swing mode has been switched to the hydraulic-alone swing mode by the process shown in the flow chart of FIG. 12, the abnormality monitoring/processing control block 81 first executes a prescribed error signal elimination process during the hydraulic-alone swing control (step S150). In cases where the error signal was caused by an overvoltage condition or an overtemperature condition, for example, a process of staying on standby until elimination of the condition causing the error signal is conducted in the error signal elimination process. Subsequently, the abnormality monitoring/processing control block 81 judges whether the error signal has been eliminated or not (step S160). When the error signal has been eliminated by the error signal elimination process or in spontaneous manner, the abnormality monitoring/processing control block 81 further judges whether the mode switching is possible with the present timing (at the present time) or not (step S170). The abnormality monitoring/processing control block 81 carries out the switching to the hydraulic/electric hybrid swing mode (returning operation) when no swing movement or operation is in progress, or in an idling state in which there is no operation (including even the movement of the front) at all, for example (step S180).

Figure 14:
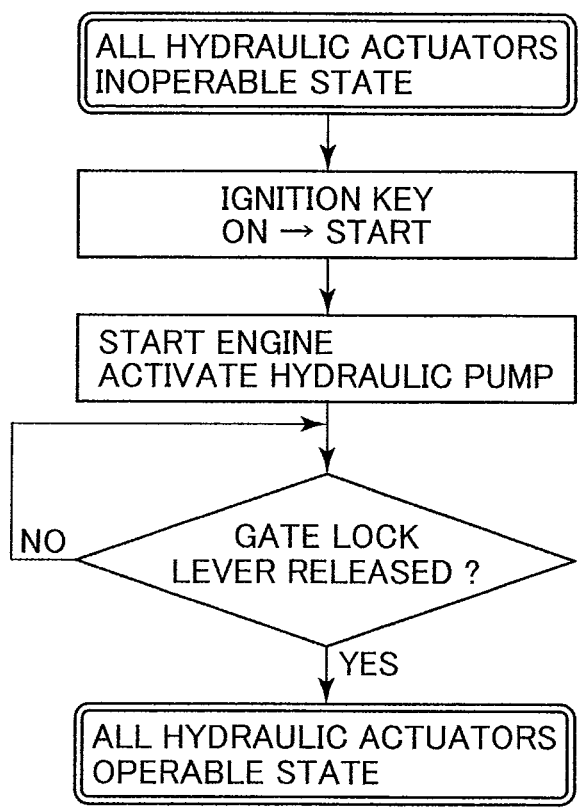
FIG. 14 is a flow chart showing a startup sequence of an ordinary hydraulic shovel.

The hydraulic shovel in accordance with the present invention, having the two switchable swing modes, is advantageous especially at the startup of the machine. FIG. 14 shows a startup sequence of an ordinary hydraulic shovel (having only a hydraulic swing motor for the swing). When the ignition key is turned from the ON position to the START position, the engine and the hydraulic pump are activated. Thereafter, when the gate lock lever is released, all the hydraulic actuators (including the swing actuator) immediately shift to their operable states.

Figure 15:
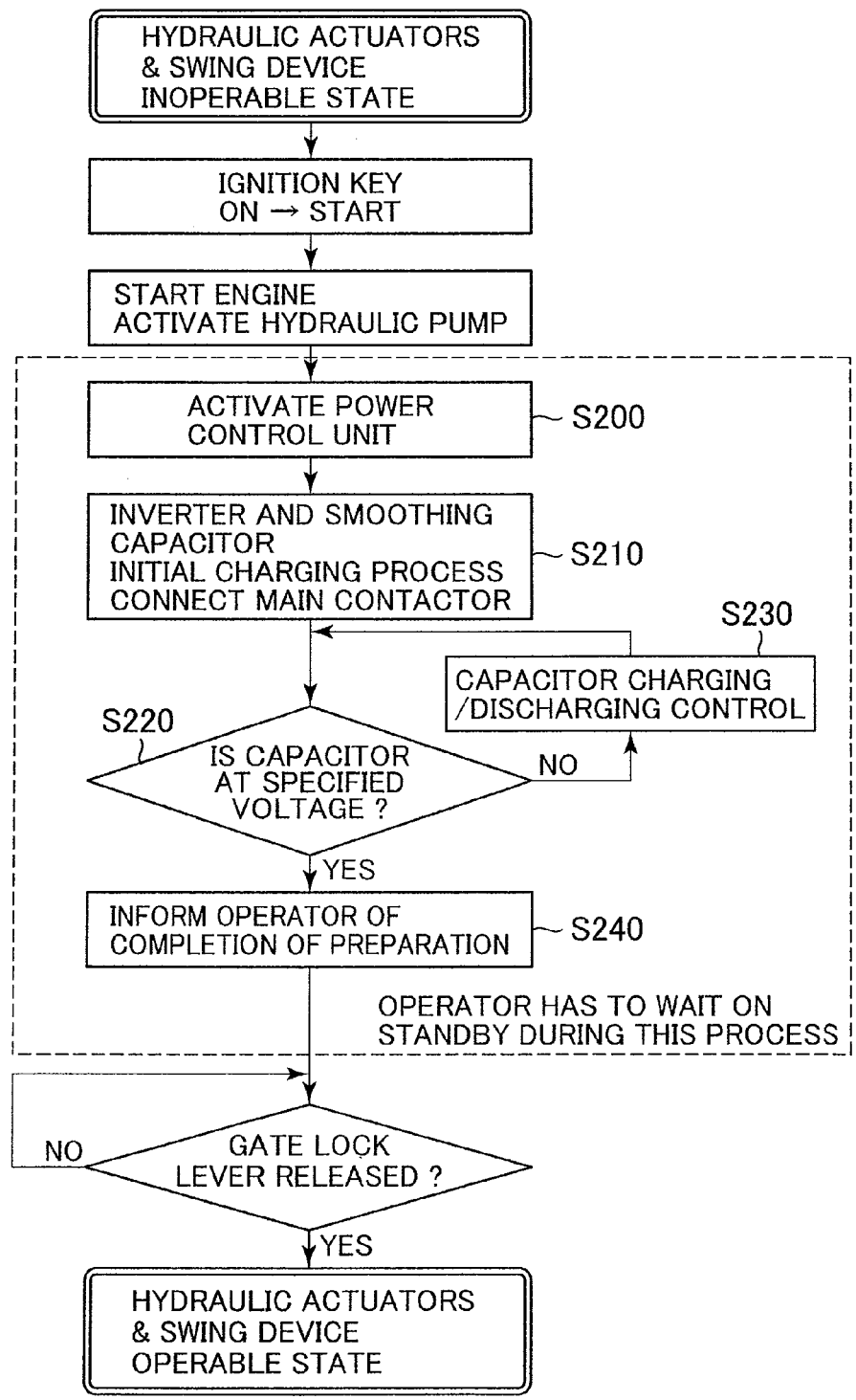
FIG. 15 is a flow chart showing a startup sequence of a conventional hybrid hydraulic shovel having a capacitor and a electric swing motor.

FIG. 15 shows a startup sequence of a conventional hybrid hydraulic shovel using an electric motor and a hydraulic motor for the swing driving and using a capacitor as the electricity storage device. In FIG. 15, a process executed by a controller is surrounded by dotted lines. Such a conventional hybrid hydraulic shovel is incapable of performing the swing operation immediately after the startup (activation) of the engine and the hydraulic pump if the amount of electricity stored in the capacitor (electric amount) is insufficient. Since the capacity of the capacitor is generally small, leaving the machine (hydraulic shovel) without starting it up for several days can lead to self-discharge of the capacitor to an insufficient electric amount with which the swing operation is impossible. Therefore, initial charging (step S200-step S240) has to be executed first at the startup of the machine and the operator has to wait on standby until the charging is finished.

Figure 16:
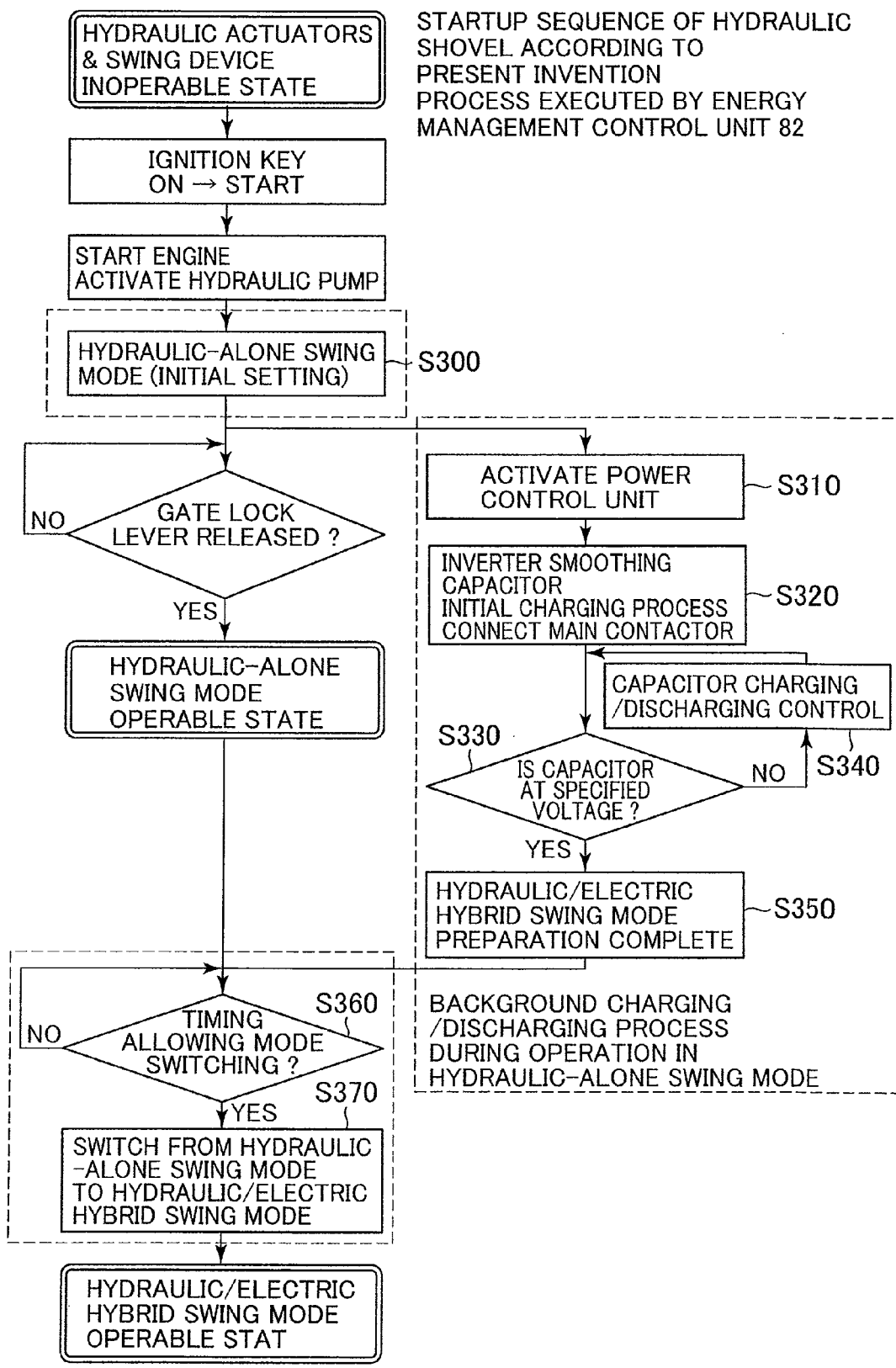
FIG. 16 is a flow chart showing a startup sequence of the hybrid hydraulic shovel in accordance with the first embodiment of the present invention.

FIG. 16 shows a startup sequence of the hybrid hydraulic shovel in accordance with the present invention. In FIG. 16, a process executed by the energy management control unit 82 of the controller 80 are surrounded by dotted lines. In the hybrid hydraulic shovel of the present invention, the energy management control unit 82 initially sets the swing mode in the hydraulic-alone swing mode (initial setting) by selecting the hydraulic-alone swing control block 84 irrespective of the electrical condition (step S300). Therefore, when the operator shifts the gate lock lever device 71 from a LOCK position to an UNLOCK (RELEASE) position and thereby turns the pilot pressure shutoff valve 76 off, the hydraulic shovel immediately shifts to its operable state. The energy management control unit 82 executes charging/discharging control, etc. as a background process (step S310-step S350) while the operator is operating the hydraulic shovel and doing work. After the electric swing motor has become drivable, the energy management control unit 82 confirms that the mode switching is possible with the present timing (at the present time) (step S360) and then switches the swing mode to the hydraulic/electric hybrid swing mode (step S370).

The charging/discharging control by the energy management control unit 82 is executed as follows: First, the energy management control unit 82 activates the power control unit 55 (step S310) and executes the initial charging process for the inverters 52 and 53 and the smoothing capacitor 54 and a connection process for the main contactor 56 (step S320). Subsequently, the energy management control unit 82 judges whether the capacitor 24 is at specified voltage or not (step S330). When the capacitor 24 is below the specified voltage, the energy management control unit 82 executes capacitor charging control by outputting a power generation command to the power assist/generation motor 23. When the capacitor 24 is above the specified voltage, the energy management control unit 82 executes capacitor discharging control via an unshown grid resistor by controlling the chopper 51 (step S340). When the capacitor 24 is at the specified voltage, the energy management control unit 82 recognizes that the preparation for the hydraulic/electric hybrid swing mode is complete (step S350).

As described above, according to this embodiment, the hydraulic shovel is equipped with both the hydraulic motor 27 and the electric motor 25 for the driving of the swing structure 20 and is configured to be switchable between the mode for executing the swing driving with the torque of both the hydraulic motor 27 and the electric motor 25 (hydraulic/electric hybrid swing mode) and the mode for executing the swing driving with the hydraulic motor 27 alone (hydraulic-alone swing mode). Thus, in the hydraulic/electric hybrid swing mode, operational actions specific to the hydraulic actuator (e.g., pressing excavation) and operational feeling specific to the hydraulic actuator can be realized while also achieving energy saving by regenerating the kinetic energy of the swing structure 20 into electric energy through the electric motor 25 at the time of braking (deceleration). Even in case of insufficiency of the energy remaining in the capacitor 24 for storing the regenerated electric energy, overcharging of the capacitor 24, or a failure, abnormality or warning occurring in the electric system, it is possible to drive the swing structure 20 with normal swing torque using the hydraulic motor 27 alone and continue the operation of the hydraulic shovel by the switching of the swing mode to the hydraulic-alone swing mode. Furthermore, even when the energy remaining in the capacitor 24 is insufficient at the startup of the hydraulic shovel, the operation (work) can be started immediately.

Figure 17:
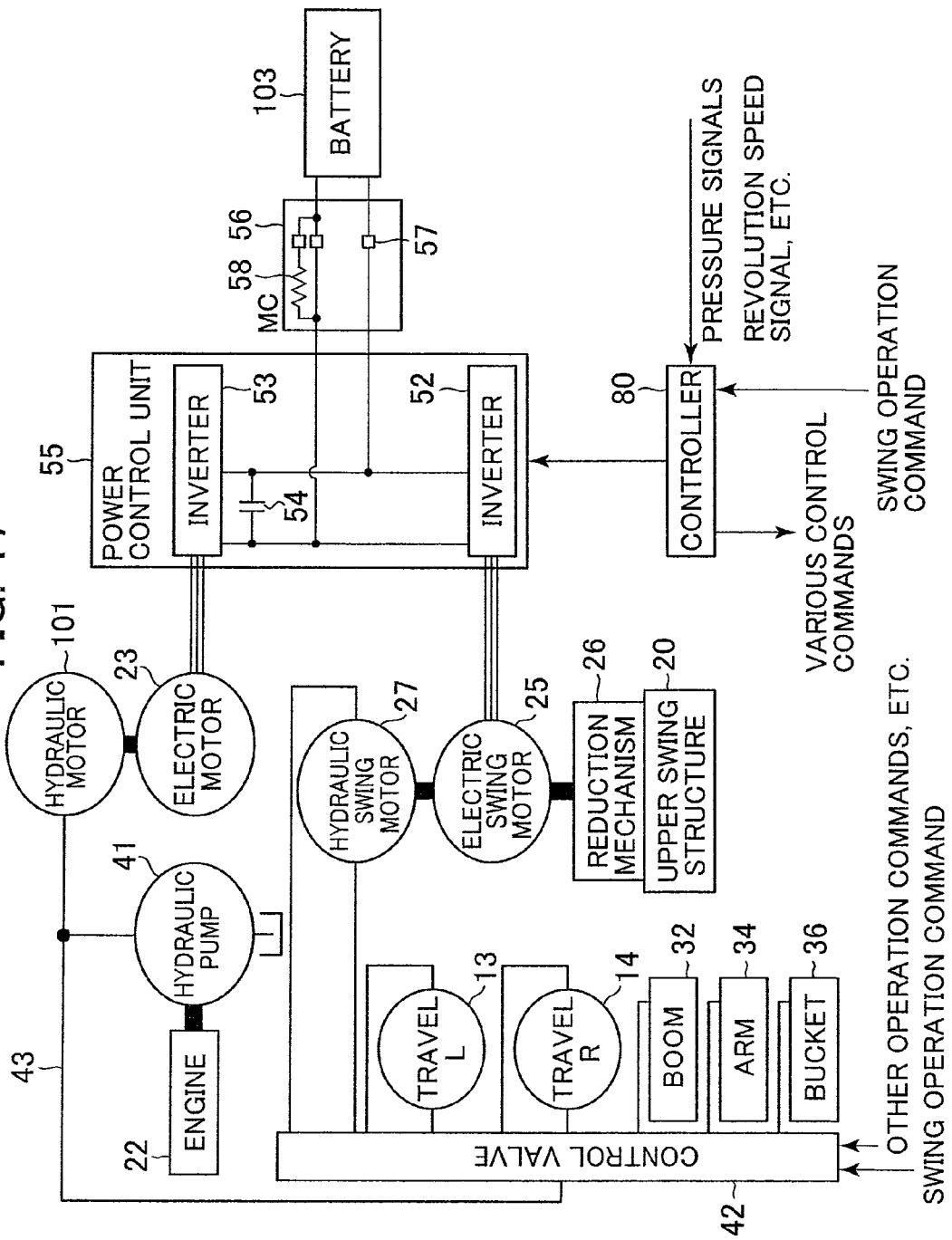
FIG. 17 is a system configuration diagram showing principal electric/hydraulic devices of a hybrid hydraulic shovel in accordance with a second embodiment of the present invention.

FIG. 17 shows the system configuration of principal electric/hydraulic devices of a hybrid hydraulic shovel in accordance with a second embodiment of the present invention. While the power assist/generation motor 23 connected to the drive shaft of the engine 22 was used in the first embodiment shown in FIG. 2, the second embodiment uses a hydraulic motor 101 driven by the hydraulic fluid discharged from the hydraulic pump 41 and an electric motor 100 (charging device) having the power generation function and connected to the drive shaft of the hydraulic motor 101. The electricity storage device can be implemented not only by the electric double layer capacitor 24 but also by a variety of devices capable of storing electricity such as a lithium-ion capacitor, a lithium-ion battery and a nickel hydride battery. In the second embodiment shown in FIG. 17, a battery 103 such as a lithium-ion battery is used as the electricity storage device.

Figure 18:
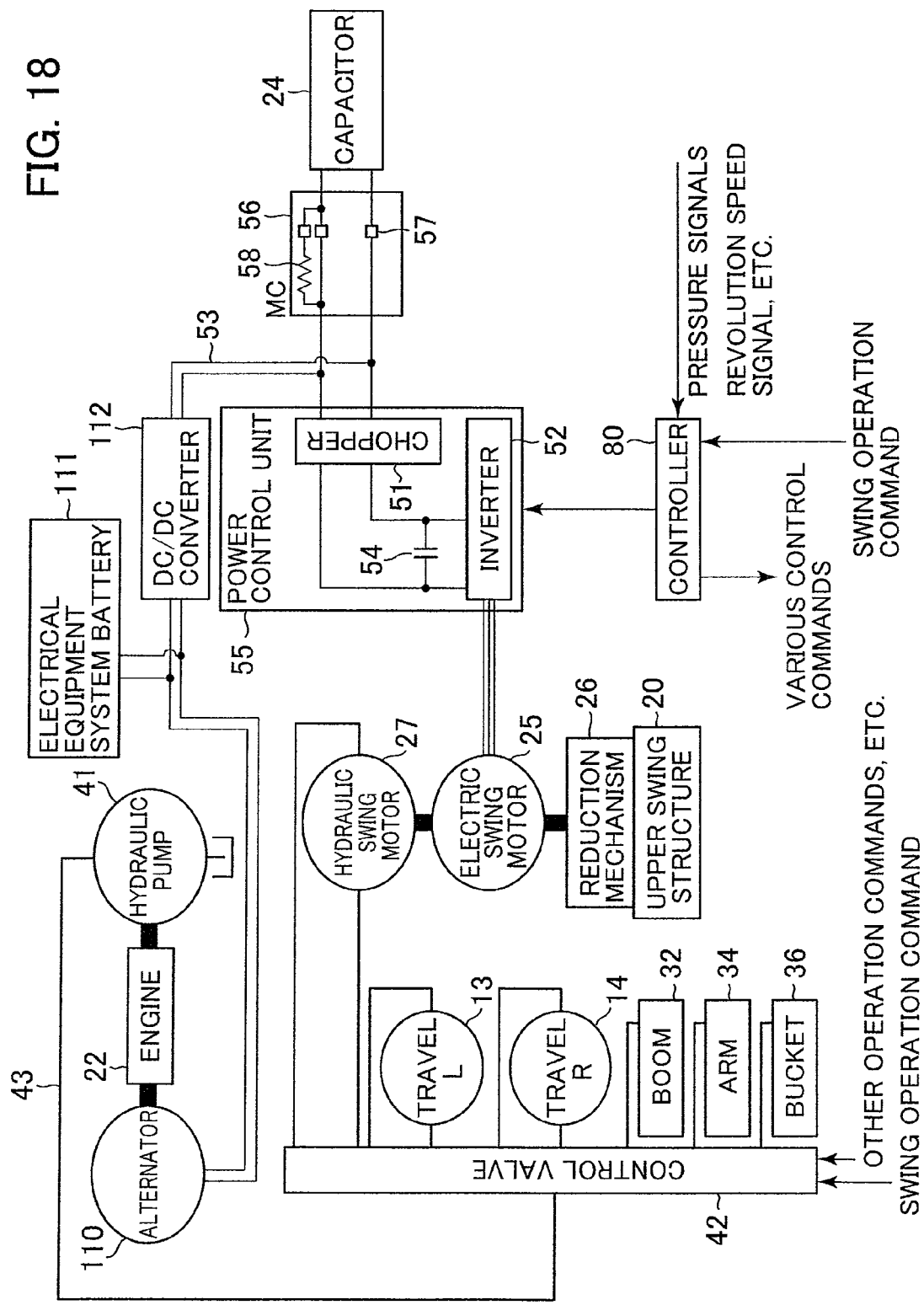
FIG. 18 is a system configuration diagram showing principal electric/hydraulic devices of a hybrid hydraulic shovel in accordance with a third embodiment of the present invention.

FIG. 18 shows the system configuration of principal electric/hydraulic devices of a hybrid hydraulic shovel in accordance with a third embodiment of the present invention. In this embodiment, voltage supplied from an electric equipment system battery line, including an alternator 110 and an electric equipment system battery 111, is boosted using a DC/DC converter 112 in order to conduct the initial charging of the capacitor 24. In this case, however, the energy management control unit 82 is required to execute the control so as to fix the electric amount of the capacitor within a certain range only by the acceleration/deceleration of the swing operation since surplus energy occurring in the capacitor 24 cannot be freely released to the electric equipment system battery line.

Figure 19:
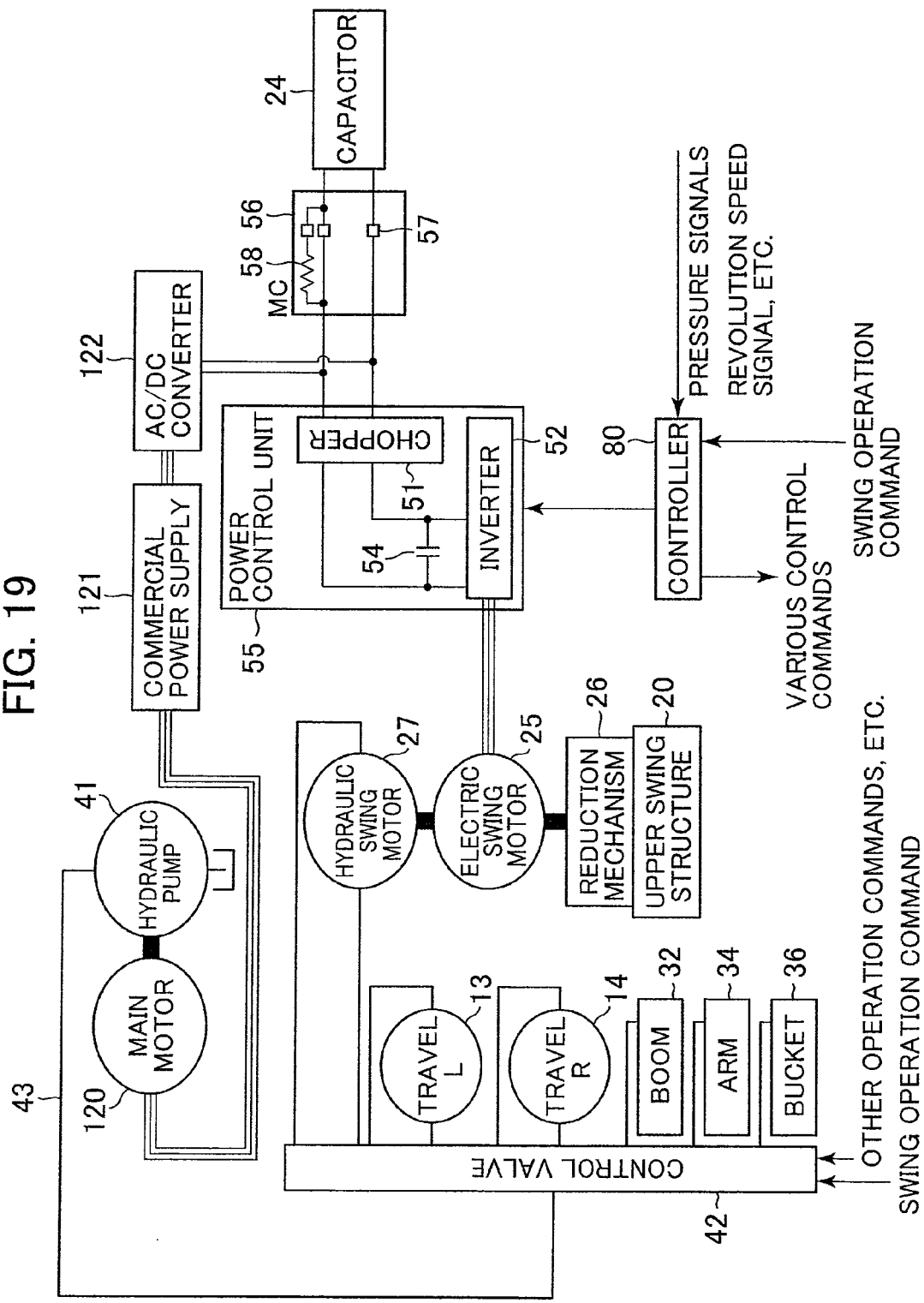
FIG. 19 is a system configuration diagram showing principal electric/hydraulic devices of a hybrid hydraulic shovel in accordance with a fourth embodiment of the present invention.
Figure 20:
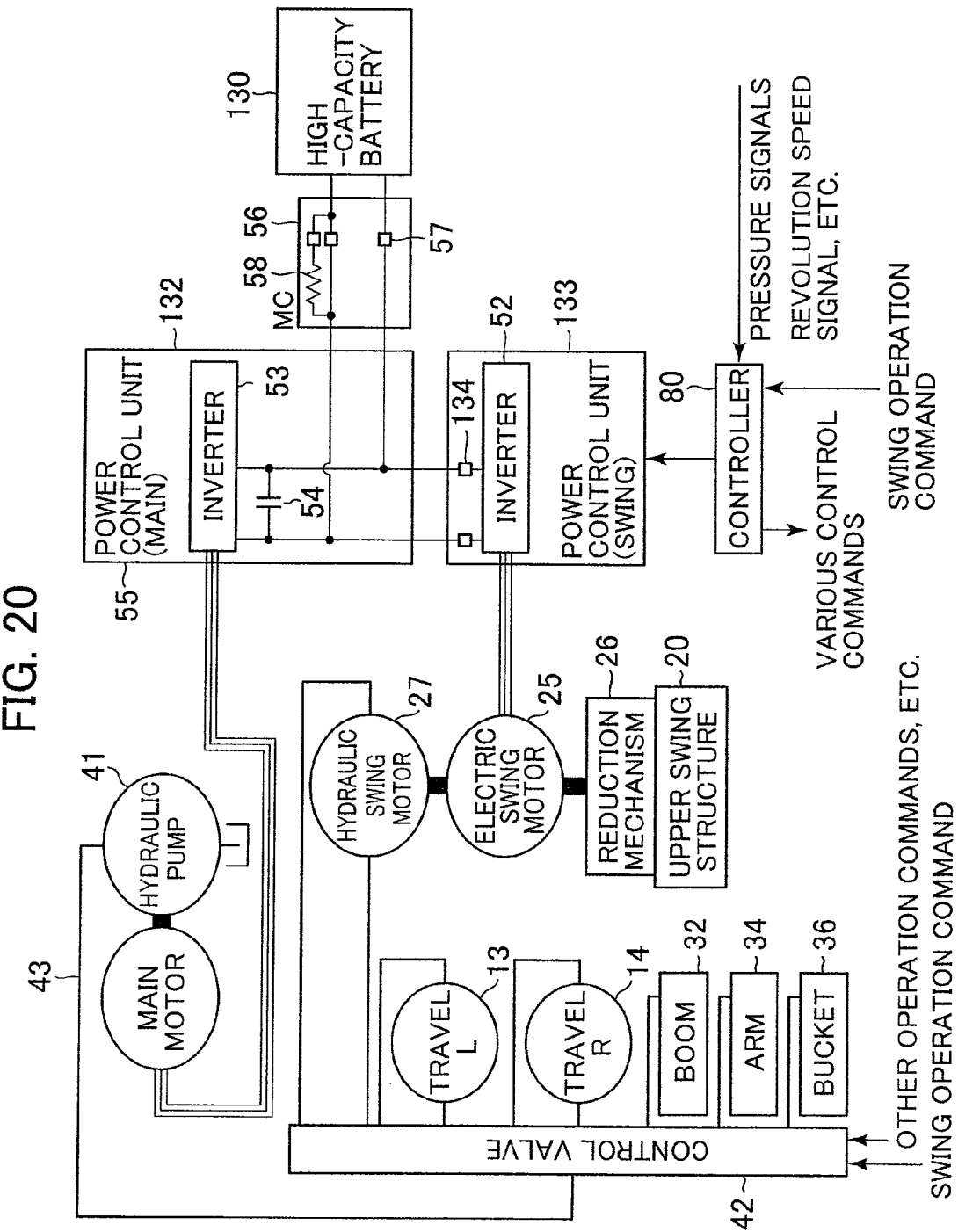
FIG. 20 is a system configuration diagram showing principal electric/hydraulic devices of a hybrid hydraulic shovel in accordance with a fifth embodiment of the present invention.

FIGS. 19 and 20 show the system configurations of principal electric/hydraulic devices of hybrid hydraulic shovels in accordance with fourth and fifth embodiments of the present invention.

While hydraulic shovels using an engine 22 as the prime mover have been illustrated in the above embodiments, the present invention is applicable also to hydraulic shovels using a different prime mover (e.g., electric motor) with no problem. The embodiment shown in FIG. 19 illustrates the system configuration of a hydraulic shovel using an electric motor 120 which is driven by AC power from a AC power supply 121. The embodiment shown in FIG. 20 illustrates the system configuration of a hydraulic shovel using an electric motor 120 which is driven by a high-capacity battery 130. In the embodiment shown in FIG. 19, voltages supplied from the AC power supply 121 are boosted using an AC/DC converter 122 in order to conduct the initial charging of the capacitor 24 similarly to the embodiment shown in FIG. 18.

The following thing has to be taken care of when applying the present invention to a hydraulic shovel using an electric motor 120 as the prime mover: If the power line and the power control unit are shared by the electric swing motor and the electric motor as the prime mover, a failure occurring in the power line or the power control unit can disable even the operation in the hydraulic-alone swing mode.

In the embodiment shown in FIG. 19, the main electric motor 120 is implemented by a three-phase AC induction motor that is directly driven by three-phase AC power from the AC power supply 121 so that the main electric motor 120 can use a power supply line separate from that for the electric swing motor 25 which uses the energy accumulated in the capacitor 24. In the embodiment shown in FIG. 20, two power control units 132 and 133 are provided separately for the main control and the swing. In case of an abnormality (e.g., short-circuit failure) occurring in the electric swing motor 25 or the swing power control unit 133, the operation in the hydraulic-alone swing mode is possible by detaching the electric swing motor 25 and the swing power control unit 133 by use of a swing electric system shutoff relay 134.

While embodiments of application of the present invention to hydraulic shovels have been described above, the essence of the present invention is the availability of the switching between the hydraulic/electric hybrid swing mode and the hydraulic-alone swing mode for the driving of the swing structure. Therefore, the present invention is applicable also to a wide variety of other construction machines having a swing structure.

DESCRIPTION OF REFERENCE CHARACTERS

10 lower travel structure
11 crawler
12 crawler frame
13 left traveling hydraulic motor
14 right traveling hydraulic motor
20 upper swing structure
21 swing frame
22 engine
23 power assist/generation motor (charging device)
24 capacitor
25 electric swing motor
26 reduction mechanism
27 hydraulic swing motor
30 shovel mechanism (front implement)
31 boom
32 boom cylinder
33 arm
34 arm cylinder
35 bucket
36 bucket cylinder
40 hydraulic system
41 hydraulic pump
42 control valve
43 hydraulic line
51 chopper
52 inverter for the electric swing motor
53 inverter for the power assist/generation motor
54 smoothing capacitor
55 power control unit
56 main contactor
57 main relay
58 inrush current prevention circuit
61 swing spool
62a, 62b variable over-load relief valve
63 center bypass cut valve
64 regulator
64a torque control unit
70 ignition key
71 gate lock lever
72 swing control lever device
73 control lever device (for movements other than swing)
74a, 74bL, 74bR hydraulic-electric conversion unit
75a, 75b, 75c, 75d electric-hydraulic conversion units
76 pilot pressure signal shutoff valve
77 hydraulic-alone swing mode fixation switch
80 controller (control device)
81 abnormality monitoring/processing control block
82 energy management control block
83 hydraulic/electric hybrid swing control block
84 hydraulic-alone swing control block
85 switching control block
100 electric motor (charging device)
101 hydraulic motor
103 battery
110 alternator
111 electric equipment system battery
112 DC/DC converter
120 main electric motor
121 commercial power supply
122 AC/DC converter
130 high-capacity battery
131 power control unit
132 power control unit for the main electric motor
133 power control unit for the electric swing motor
134 swing electric system shutoff relay

The invention claimed is:

1. A hybrid construction machine comprising:
a prime mover;
a hydraulic pump driven by the prime mover;
a swing structure;
an electric motor for driving the swing structure;
a hydraulic motor for driving the swing structure, and the hydraulic motor being driven by the hydraulic pump;
an electricity storage device connected to the electric motor;
a swing control lever device which outputs a command regarding the driving of the swing structure;
a first control device which switches a swing mode regarding the driving of the swing structure between:
a hydraulic/electric hybrid swing mode for driving the swing structure by a total torque of the electric motor and the hydraulic motor by driving both the electric motor and the hydraulic motor when the swing control lever device is operated, and
a hydraulic-alone swing mode for driving the swing structure by a torque of the hydraulic motor alone by driving only the hydraulic motor when the swing control lever device is operated;
a second control device which controls transfer of electric power between the electricity storage device and the electric motor; and
a swing hydraulic system which includes a swing spool for controlling the flow of hydraulic fluid supplied from the hydraulic pump to the hydraulic motor and the flow of the hydraulic fluid returned from the hydraulic motor to a tank,
wherein the swing hydraulic system is switchable between a first mode in which a maximum output torque of the hydraulic motor equals a first torque and a second mode in which the maximum output torque of the hydraulic motor equals a second torque that is higher than the first torque, and
wherein the first control device includes:
a hydraulic/electric hybrid swing control unit which switches the swing hydraulic system to the first mode and which outputs a torque command to the second control device and thereby drives the electric motor when the swing control lever device is operated,
a hydraulic-alone swing control unit which switches the swing hydraulic system to the second mode and stops the output of the torque command to the second control device, and
switching between the hydraulic/electric hybrid swing mode and the hydraulic-alone swing mode by selecting one of the hydraulic/electric hybrid swing control unit and the hydraulic-alone swing control unit.

2. The hybrid construction machine according to claim 1, wherein:
the first control device drives the swing structure in the hydraulic/electric hybrid swing mode in a normal operation state, and
the first control device automatically switches the swing mode from the hydraulic/electric hybrid swing mode to the hydraulic-alone swing mode when a predetermined type of failure, abnormality or warning state has occurred in an electric system for the driving of the electric motor including the electric motor and the electricity storage device.

3. The hybrid construction machine according to claim 2, wherein the first control device automatically switches the swing mode from the hydraulic-alone swing mode to the hydraulic/electric hybrid swing mode when the failure, abnormality or warning has been eliminated.

4. The hybrid construction machine according to claim 1, wherein:
the first control device drives the swing structure in the hydraulic/electric hybrid swing mode when the amount of electricity stored in the electricity storage device is within a prescribed range, and
the first control device automatically switches the swing mode from the hydraulic/electric hybrid swing mode to the hydraulic-alone swing mode when the amount of electricity stored in the electricity storage device has gone out of the prescribed range.

5. The hybrid construction machine according to claim 1, wherein the first control device executes the switching between the hydraulic/electric hybrid swing mode and the hydraulic-alone swing mode exclusively in a state in which the swing structure is not moving.

6. The hybrid construction machine according to claim 1, wherein the first control device executes the switching between the hydraulic/electric hybrid swing mode and the hydraulic-alone swing mode exclusively in a state in which the swing structure is not moving and the swing control lever device is not being operated.

7. The hybrid construction machine according to claim 1, wherein the first control device executes the switching between the hydraulic/electric hybrid swing mode and the hydraulic-alone swing mode exclusively in a state in which there is no movement of the swing structure, no input to the swing control lever device, no movement of the devices other than the swing structure and no input to an operating device for the prescribed devices other than the swing structure.

8. The hybrid construction machine according to claim 1, wherein:
the hydraulic motor outputs a maximum torque to independently drive the swing structure, and
the electric motor outputs a maximum torque that is lower than the maximum torque of the hydraulic motor.

9. The hybrid construction machine according to claim 1, wherein:
the first control device charges the electricity storage device with a charging device when the amount of electricity stored in the electricity storage device just after startup of the construction machine is lower than a prescribed electric amount necessary for the operation in the hydraulic/electric hybrid swing mode,
the first control device executes the swing operation in the hydraulic-alone swing mode when the swing control lever device is operated during the charging process, and
the first control device switches the swing mode to the hydraulic/electric hybrid swing mode after the amount of electricity stored in the electricity storage device has reached the prescribed electric amount.

10. The hybrid construction machine according to claim 1, wherein:
the first control device discharges the electricity storage device when the amount of electricity stored in the electricity storage device just after startup of the construction machine is higher than a prescribed electric amount necessary for the operation in the hydraulic/electric hybrid swing mode,
the first control device executes the swing operation in the hydraulic-alone swing mode when the swing control lever device is operated during the discharging process, and
the first control device switches the swing mode to the hydraulic/electric hybrid swing mode after the amount of electricity stored in the electricity storage device has reached the prescribed electric amount.

11. The hybrid construction machine according to claim 1, wherein:
the prime mover is an electric motor, and
the prime mover is powered by a AC power supply.

12. The hybrid construction machine according to claim 1, wherein:
the prime mover is an electric motor, and
the prime mover is powered by the electricity storage device.

13. The hybrid construction machine according to claim 1, wherein the first control device further executes the hydraulic/electric hybrid swing control unit in a normal operation state and executes the hydraulic-alone swing control unit when a prescribed type of failure, abnormality or warning state has occurred in an electric system including the electric motor, the electricity storage device and the second control device.

14. The hybrid construction machine according to claim 1, wherein the first control device further executes the hydraulic/electric hybrid swing control unit when the amount of electricity stored in the electricity storage device is within a prescribed range and executes the hydraulic-alone swing control unit when the amount of electricity stored in the electricity storage device has gone out of the prescribed range.

* * * * *